US012745151B2

(12) United States Patent
Miyamoto et al.

(10) Patent No.: US 12,745,151 B2
(45) Date of Patent: Sep. 22, 2026

(54) WIRELESS COMMUNICATION SYSTEM AND WIRELESS COMMUNICATION METHOD

(71) Applicant: NTT, Inc., Tokyo (JP)

(72) Inventors: Kenji Miyamoto, Musashino (JP); Yoshihito Sakai, Musashino (JP); Tatsuya Shimada, Musashino (JP)

(73) Assignee: NTT, Inc., Tokyo (JP)

( * ) Notice: Subject to any disclaimer, the term of this patent is extended or adjusted under 35 U.S.C. 154(b) by 283 days.

(21) Appl. No.: 18/578,863

(22) PCT Filed: Aug. 6, 2021

(86) PCT No.: PCT/JP2021/029322
§ 371 (c)(1),
(2) Date: Jan. 12, 2024

(87) PCT Pub. No.: WO2023/013038
PCT Pub. Date: Feb. 9, 2023

(65) Prior Publication Data
US 2024/0323800 A1 Sep. 26, 2024

(51) Int. Cl.
*H04W 36/18* (2009.01)
*H04W 40/12* (2009.01)

(52) U.S. Cl.
CPC .......... *H04W 36/18* (2013.01); *H04W 40/12* (2013.01)

(58) Field of Classification Search
CPC .............................. H04W 36/18; H04W 40/12
See application file for complete search history.

(56) References Cited

U.S. PATENT DOCUMENTS

2022/0353799 A1* 11/2022 Talebi Fard .......... H04W 76/10

OTHER PUBLICATIONS

"Cisco's end-to-end architecture for the 5G era", Cisco, 2020.
"3GPP TS 38.300 V16.5.0", 3GPP, 2021.
"3GPP TS 38.401 V16.5.0", 3GPP, 2021.

* cited by examiner

*Primary Examiner* — Shawn D Miller
(74) *Attorney, Agent, or Firm* — Harness, Dickey & Pierce, P.L.C.

(57) ABSTRACT

According to an aspect of the present invention, there is a wireless communication system including: a plurality of end wireless devices that include an antenna and transmit and receive signals to and from a wireless terminal which is a communication target; a plurality of transfer devices that transfer signals which are transmitted and received by the wireless terminal which is a communication target and the end wireless device; and a transfer management device that, in a case where communication status information indicating a status of communication between the wireless terminal and the end wireless devices is received, executes a transfer route control process of controlling paths between the plurality of transfer devices on the basis of the received or communication status information, wherein the end wireless devices execute a switching process of controlling operations of the end wireless devices relating to communication between the end wireless devices and the wireless terminal on the basis of the communication status information, and the transfer management device receives the communication status information before the switching process is completed.

11 Claims, 24 Drawing Sheets

WIRELESS COMMUNICATION SYSTEM AND WIRELESS COMMUNICATION METHOD

CROSS-REFERENCE TO RELATED APPLICATIONS

This application is a 371 U.S. National Phase of International Application No. PCT/JP2021/029322, filed on Aug. 6, 2021. The entire disclosure of the above application is incorporated herein by reference.

TECHNICAL FIELD

The present invention relates to a wireless communication system and a wireless communication method.

BACKGROUND ART

In a case where a wireless terminal such as a smartphone that communicates with a server moves, a base station with which the wireless terminal is affiliated may change. In such a case, a path for communication between the server and the wireless terminal is changed with the change of the base station of current affiliation. As for the changed path, a path determined in advance is used when there is no factor that could interfere with communication such as bandwidth shortage. On the other hand, in a case where there is a factor that could interfere with communication such as bandwidth shortage, a new path is added. The addition of a new path is, for example, addition of a new path in a transfer device network performed by a transfer device controller. These paths are, for example, logical paths based on a virtual local area network (VLAN) or physical paths based on wavelength.

CITATION LIST

Non Patent Literature

[NPL 1] "Cisco's end-to-end architecture for the 5G era," Cisco, 2020.
[NPL 2] "3GPP TS 38.300 V16.5.0," 3GPP, 2021.
[NPL 3] "3GPP TS 38.401 V16.5.0," 3GPP, 2021.

SUMMARY OF INVENTION

Technical Problem

However, since the addition of a new path is executed before communication from a server to a base station which is a change destination of affiliation starts, communication does not start until the formation of a new path is completed, which sometimes causes a delay in communication.

In view of the above circumstances, an object of the present invention is to provide a technique of reducing a delay in communication caused by the movement of a wireless terminal.

Solution to Problem

According to an aspect of the present invention, there is a wireless communication system including: a plurality of end wireless devices that include an antenna and transmit and receive signals to and from a wireless terminal which is a communication target; a plurality of transfer devices that transfer signals which are transmitted and received by the wireless terminal which is a communication target and the end wireless device; and a transfer management device that, in a case where communication status information indicating a status of communication between the wireless terminal and the end wireless devices is received, executes a transfer route control process of controlling paths between the plurality of transfer devices on the basis of the received communication status information, wherein the end wireless devices execute a switching process of controlling operations of the end wireless devices relating to communication between the end wireless devices and the wireless terminal on the basis of the communication status information, and the transfer management device receives the communication status information before the switching process is completed.

According to an aspect of the present invention, there is provided a wireless communication method which is executed by a wireless communication system including a plurality of end wireless devices that include an antenna and transmit and receive signals to and from a wireless terminal which is a communication target, a plurality of transfer devices that transfer signals which are transmitted and received by the wireless terminal which is a communication target and the end wireless device, and a transfer management device that, in a case where communication status information indicating a status of communication between the wireless terminal and the end wireless devices is received, executes a transfer route control process of controlling paths between the plurality of transfer devices on the basis of the received communication status information, the method including: a switching step in which the end wireless devices execute a switching process of controlling operations of the end wireless devices relating to communication between the end wireless devices and the wireless terminal on the basis of the communication status information; and a reception step in which the transfer management device receives the communication status information before the switching process is completed.

Advantageous Effects of Invention

According to the present invention, it is possible to reduce a delay in communication caused by the movement of a wireless terminal.

DESCRIPTION OF EMBODIMENTS

First Embodiment

Figure 1:
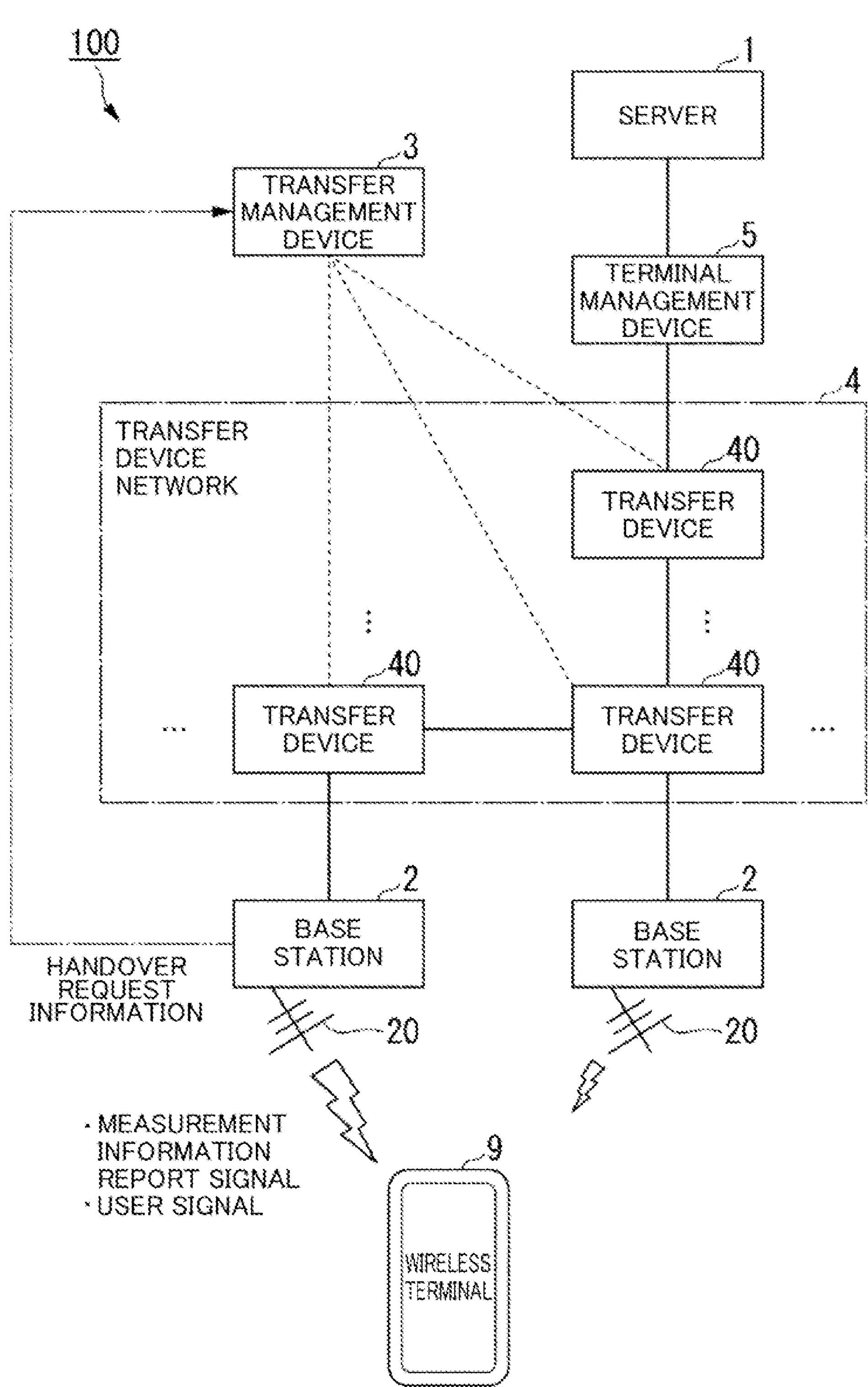
FIG. 1 is a diagram illustrating an example of a configuration of a wireless communication system 100 of a first embodiment.

FIG. 1 is a diagram illustrating an example of a configuration of a wireless communication system 100 of a first embodiment. The wireless communication system 100 communicates with a wireless terminal 9 capable of wireless communication such as a smartphone. That is, the wireless terminal 9 is a communication target for the wireless communication system 100. The wireless communication system 100 includes a server 1, a plurality of base stations 2, a transfer management device 3, a transfer device network 4, and a terminal management device 5.

The server 1 is an information processing device that communicates with the wireless terminal 9 and processes information exchanged with the wireless terminal 9. Specifically, the server 1 receives information transmitted by the wireless terminal 9 through communication with the wireless terminal 9. The server 1 performs processing of the received information such as analysis of the received information. The server 1 transmits information to the wireless terminal 9 through communication with the wireless terminal 9.

The base station 2 transmits and receives signals to and from the wireless terminal 9. The base station 2 has a transmitting/receiving antenna 20 and exchanges radio waves with the wireless terminal 9 through the transmitting/receiving antenna 20. The transmitting/receiving antenna 20 is an antenna that transmits and receives signals to and from the wireless terminal 9. One of the signals transmitted and received by the base station 2 to and from the wireless terminal 9 is a user signal. The user signal is information interchanged between the wireless terminal 9 and the server 1 and is a signal indicating information to be processed by the server 1 (hereinafter referred to as "user information").

The base station 2 receives a measurement information report signal from the wireless terminal 9. The measurement information report signal is a signal received by the wireless terminal 9 and is a signal indicating the strength of a signal transmitted from the transmitting/receiving antenna 20 (hereinafter referred to as "terminal signal strength"). More specifically, the measurement information report signal is a signal that carries information indicating the terminal signal strength (hereinafter referred to as "terminal signal strength information"). The measurement information report signal indicates the terminal signal strength of at least a base station 2 with which the wireless terminal 9 is affiliated and a base station 2 that is a candidate for a change destination of affiliation.

The base station 2 with which the wireless terminal 9 is affiliated is a base station used for communication between the server 1 and the wireless terminal 9. The base station 2 with which the wireless terminal 9 is affiliated is a base station that satisfies a predetermined condition regarding the intensity of the terminal signal strength (hereinafter referred to as a "terminal signal strength condition"). The terminal signal strength condition is, for example, a condition that the terminal signal strength is maximum. That is, in a case where the content of the terminal signal strength condition is a condition that the terminal signal strength is maximum, a base station 2 having a higher terminal signal strength than the other base station 2 is the base station 2 with which the wireless terminal 9 is affiliated.

According to the Maxwell equation, the strength of a signal can vary, for example, with the distance between the wireless terminal 9 and the base station 2. For example, in a case where a signal propagates in a space that can be regarded as an approximately free space, the strength increases as the distance between the wireless terminal 9 and the base station 2 becomes closer. Therefore, the base station satisfying the terminal signal strength condition changes with the movement of the wireless terminal 9. In the case of the approximately free space as described above, the strength increases as the distance between the wireless terminal 9 and the base station 2 becomes closer. Thus, the base station 2 that is a candidate for a change destination of affiliation is, for example, a base station 2 spatially adjacent to the base station 2 of current affiliation.

Hereinafter, the base station 2 of current affiliation is referred to as a movement source base station. Hereinafter, the base station 2 that is a change destination of affiliation is referred to as a movement destination base station.

The movement source base station (that is, the base station 2 of current affiliation) executes a handover execution determination process on the basis of the terminal signal strength information. The handover execution determination process is a process of determining the base station 2 satisfying the terminal signal strength condition on the basis of the terminal signal strength information and determining whether a handover process is executed.

The handover process is a process of changing the operations of the movement source base station and the movement destination base station so that the base station 2 determined to satisfy the terminal signal strength condition (that is, the movement destination base station) starts operating as the movement source base station.

The handover execution determination process is, for example, a process of executing an affiliation change determination process and a change destination determination process.

The affiliation change determination process is a process of determining whether it is necessary to change the affiliation destination of the wireless terminal 9 on the basis of the terminal signal strength information. The affiliation change determination process is specifically a process of determining whether the base station 2 of current affiliation satisfies the terminal signal strength condition. In such a case, when it is determined that the base station 2 of current affiliation does not satisfy the terminal signal strength condition, it is determined that the affiliation needs to be changed. Determining in the affiliation change determination process that the affiliation needs to be changed means determining to execute the handover process.

The change destination determination process is a process of determining, on the basis of the terminal signal strength information, which movement destination base station candidate should be selected as the movement destination base station when it is determined that the affiliation needs to be changed, as a result of the execution of the affiliation change determination process. That is, the change destination determination process is a process of determining the movement destination base station on the basis of the terminal signal strength information when it is determined that the affiliation needs to be changed as a result of the execution of the affiliation change determination process. More specifically, the change destination determination process is a process of determining the base station 2 satisfying the terminal signal strength condition when it is determined that the affiliation needs to be changed as a result of the execution of the affiliation change determination process.

In a case where it is determined that the base station 2 satisfying the terminal signal strength condition has been changed as a result of the execution of the handover execution determination process, handover request information is transmitted from the movement source base station to the base station 2 determined to satisfy the terminal signal strength condition. The handover request information is information indicating that the base station 2 satisfying the terminal signal strength condition has been changed from the base station 2 of current affiliation to the other base station 2 and the base station 2 that is a change destination.

Meanwhile, a case where it is determined that the base station 2 satisfying the terminal signal strength condition has been changed is a case where it is determined in the handover execution determination process that the base station 2 with which the wireless terminal 9 is affiliated is not the base station 2 of current affiliation.

In a case where the handover request information is transmitted to the base station 2 determined to satisfy the terminal signal strength condition, the handover process is executed by the movement source base station and the movement destination base station.

In the wireless communication system 100, the base station 2 of current affiliation also transfers the handover request information to the transfer management device 3. An effect produced by the handover request information also being transferred from the base station 2 of current affiliation to the transfer management device 3 (hereinafter referred to as a "first advance effect") and the operation of the transfer management device 3 that receives the handover request information will be described later with reference to FIG. 2.

The transfer management device 3 manages the transfer device network 4. The transfer device network 4 includes a plurality of transfer devices 40. The transfer device network 4 is bi-directional, and uses some or all of the plurality of transfer devices 40 to transfer signals input to the transfer device network 4 by the transfer source to the transfer destination. The transfer device 40 is a device that outputs an input signal to an output destination.

An example of a set of transfer source and transfer destination of the transfer device network 4 is the base station 2 and the terminal management device 5. Since the transfer device network 4 is bi-directional, the roles of the transfer source and the transfer destination are reversed when the direction of signal flow is reversed. Therefore, the set of terminal management device 5 and base station 2 is also an example of a set of transfer source and transfer destination of the transfer device network 4.

A signal propagated from the base station 2 to the transfer device 40 is a user signal transmitted by the wireless terminal 9. In addition, a signal transferred to the base station 2 by the transfer device 40 is a user signal transmitted by the server 1. Thus, the transfer device 40 is a transfer device that transfers signals which are transmitted and received by the wireless terminal 9 and the base station 2.

The management of the transfer device network 4 performed by the transfer management device 3 is specifically the execution of a transfer route control process. The transfer route control process is a process in which the network of a transfer device that transfers information is a control target, and is a process of controlling a path for transferring information in the control target. That is, the transfer route control process is a process of controlling paths between a plurality of transfer devices included in the control target.

The control target of the transfer route control process executed by the transfer management device 3 is the transfer device network 4. The transfer route control process executed by the transfer management device 3 is a process of controlling some or all of the transfer devices 40 included in the transfer device network 4 to control a path for connecting the transfer source and the transfer destination.

The transfer route control process is, for example, a process of determining a signal output destination and a signal input source for each transfer device 40 and then controlling the operation of the transfer device 40 to connect each transfer device 40 to the determined output destination and input source. One result of the transfer route control process is, for example, a result that a path is added. However, it does not necessarily have to be added. For example, the result may be that unused paths are deleted and necessary paths are generated.

The terminal management device 5 is connected to the server 1 and the transfer device network 4. The terminal management device 5 outputs the user signal transferred from the transfer device network 4 to the server 1. The terminal management device 5 receives the user signal output by the server 1 and outputs the received user signal to the transfer device network 4.

The terminal management device 5 manages the wireless terminal 9. The management of the wireless terminal 9 performed by the terminal management device 5 specifically involves, for example, ascertaining which base station 2 the wireless terminal 9 is affiliated with and determining which base station 2 the user signal exchanged with the server is transmitted to. The terminal management device 5 is, for example, a device that executes the access and mobility management function (AMF) and user plane function (UPF) of the 5G core in the communication standard of 5G.

Figure 2:
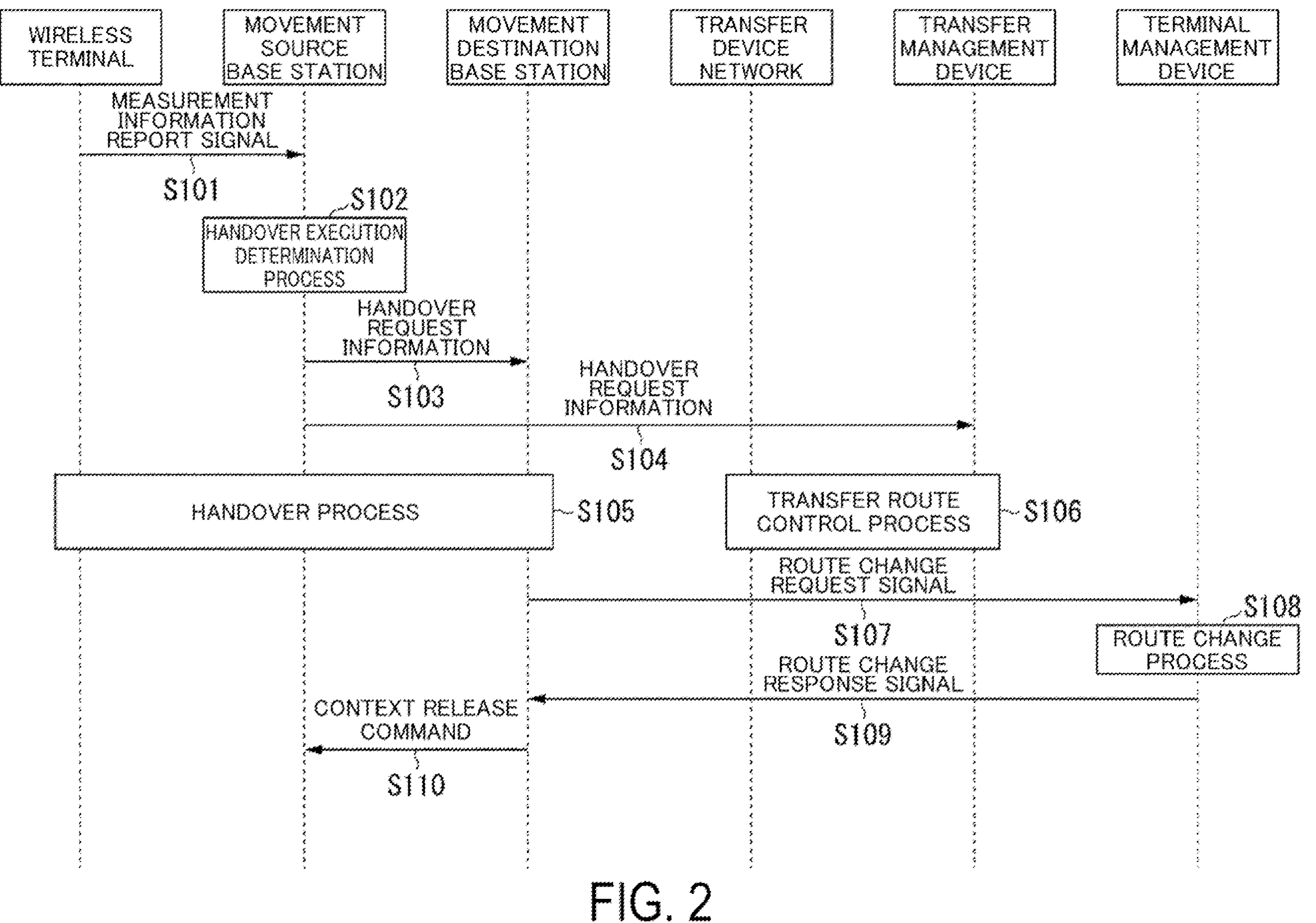
FIG. 2 is a sequence diagram illustrating an example of a flow of processing executed by the wireless communication system 100 of the first embodiment.

FIG. 2 is a sequence diagram illustrating an example of a flow of processing executed by the wireless communication system 100 of the first embodiment. More specifically, FIG. 2 is a diagram illustrating an example of a flow of processing executed by the wireless communication system 100, taking as an example a case where the result of the handover execution determination process is a result that the affiliation needs to be changed.

The wireless terminal 9 transmits a measurement information report signal to the movement source base station (step S101). The movement source base station receives the transmitted measurement information report signal. Next, the movement source base station executes the handover execution determination process (step S102).

Next, the movement source base station transmits the handover request information to the base station 2 determined to be the movement destination base station in the handover execution determination process (step S103). The movement destination base station receives the transmitted handover request information. In addition, the movement source base station also transmits the handover request information to the transfer management device 3 (step S104). The transfer management device 3 receives the transmitted handover request information. Next, the handover process is executed by the wireless terminal 9, the movement source base station, and the movement destination base station (step S105).

The process of step S104 may be executed at any timing insofar as it is executed after the execution of step S102 and before the completion of step S105. For example, the process of step S104 may be executed before the execution of step S103. Thus, the transfer management device 3 receives the handover request information before the execution of step S105 is completed.

The transfer management device 3 that has received the handover request information executes the transfer route control process on the transfer device network 4 (step S106). In the transfer route control process executed in the process of step S106, paths between the plurality of transfer devices 40 are controlled on the basis of the received handover request information. The transfer route control process includes, for example, path calculation processing, path formation command processing, and path formation response processing. The path calculation processing includes first path processing and second path processing.

The first path processing is a process of determining whether an additional path needs to be formed in the transfer device network 4 on the basis of the handover request information. The second path processing is a process which is executed in a case where it is determined in the first path processing that an additional path needs to be formed and is a process of forming an additional path to be formed in the transfer device network 4 on the basis of the handover request information. For example, the need for an additional path in the first path processing can be determined from the tight band conditions for each path collected from the transfer device network by the transfer management device. In addition, for example, additional path formation in the second path processing is performed on the basis of an identifier of the movement destination base station included in the handover request information. The identifier of this base station is, for example, a base station ID or a base station IP address.

The path formation command processing is executed in a case where it is determined in the first path processing that an additional path needs to be formed. The path formation command processing is a process in which the transfer management device 3 notifies the transfer device network 4 of a path formation instruction. The path formation instruction is an instruction to notify the transfer device network 4 to form a path determined in the second path processing within the transfer device network 4.

The transfer device network 4 that has received the path formation instruction forms a path according to the path formation instruction. The path formation response processing is executed after the formation of a path according to the path formation instruction. The path formation response processing is a process in which the transfer device network 4 transmits information indicating that a path according to the path formation instruction has been formed to the transfer management device 3.

As described above, the transfer management device 3 receives the handover request information before the execution of step S105 is completed. Thus, the transfer management device 3 can execute the transfer route control process before the completion of the handover process.

After the execution of the handover process is completed, the movement destination base station transmits a route change request signal to the terminal management device 5 (step S107). The route change request signal is a signal indicating a request for changing a path of communication between the terminal management device 5 and the base station 2. When the route change request signal is received, the terminal management device 5 executes a route change process (step S108).

The route change process is a process of changing communication between the terminal management device 5 and the base station 2 to communication through the path formed in the handover process and the transfer route control process. That is, the route change process is a process of changing the operation of the terminal management device 5 so that communication through the path formed in the handover process and the transfer route control process is performed.

Next, the terminal management device 5 transmits a route change response signal to the movement destination base station (step S109). The route change response signal is a signal indicating that the route change process has been completed. Next, the movement destination base station transmits a context release command to the movement source base station (step S110). The context release command is a signal indicating an instruction to erase information relating to the wireless terminal 9 (hereinafter referred to as "context information") accumulated during the affiliation of the wireless terminal 9.

Meanwhile, in FIG. 2, an example of a flow of processing executed by the wireless communication system 100 has been described taking as an example a case where the result of the handover execution determination process is a result that the affiliation needs to be changed. In a case where the result of the handover execution determination process is not the result that the affiliation needs to be changed, the flow returns to the process of step S101 after step S102.

In addition, in a case where it is determined in the first path processing executed in step S106 that an additional path need not to be formed in the transfer device network 4, the second path processing, the path formation command processing, and the path formation response processing are not executed.

<First Advance Effect>

The first advance effect will be described. As shown in the sequence diagram of FIG. 2, in the wireless communication system 100, the handover request information is also transferred from the base station 2 of current affiliation to the transfer management device 3. The timing is before the completion of the handover process. Therefore, the execution of the handover process and the execution of the transfer route control process can be performed simultaneously.

In a case where the process of step S104 is executed after the execution of the handover process, the handover process and a path formation process will not be executed simultaneously. Therefore, in a case where the process of step S104 is executed after the execution of the handover process, it takes more time to form a path than the processing shown in the sequence diagram of FIG. 2.

Conversely, in the wireless communication system 100, the handover request information is also transferred from the base station 2 of current affiliation to the transfer management device 3 before the completion of the handover process, and thus it is possible to reduce the time required to form a path. This effect is the first advance effect.

Figure 3:
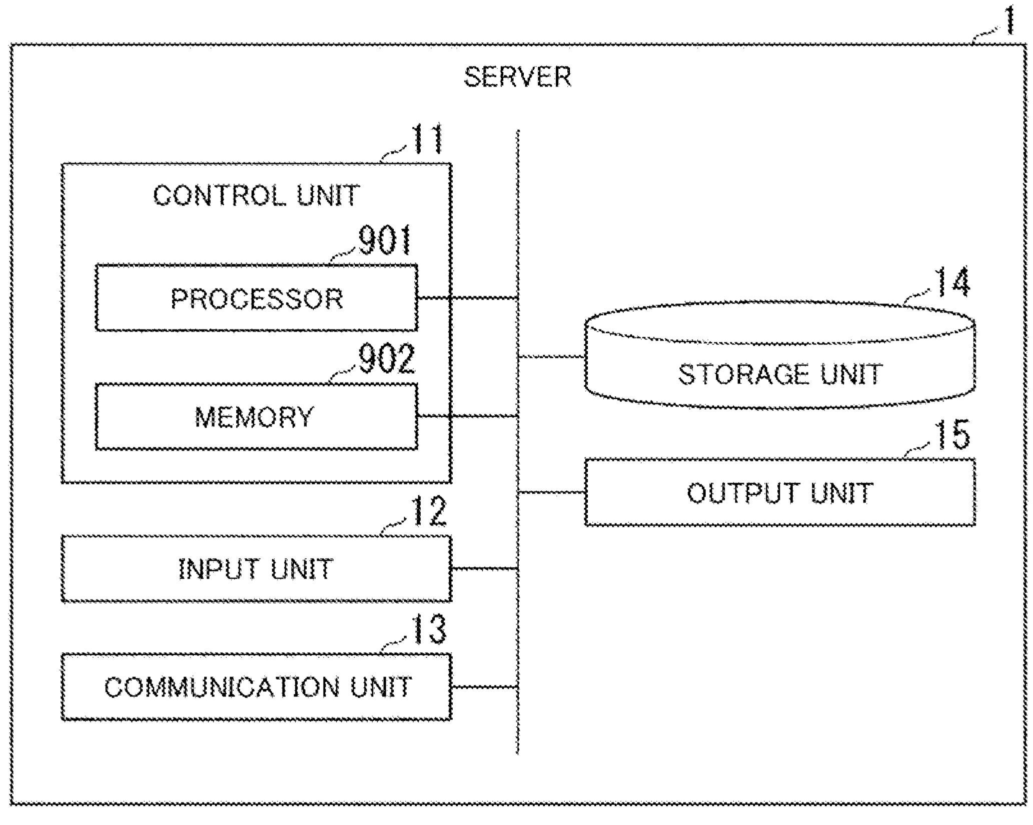
FIG. 3 is a diagram illustrating an example of a hardware configuration of a server 1 in the first embodiment.

FIG. 3 is a diagram illustrating an example of a hardware configuration of the server 1 in the first embodiment. The server 1 includes a control unit 11 having a processor 901 such as a central processing unit (CPU) and a memory 902 which are connected to each other through a bus, and executes a program. The server 1 functions as a device including the control unit 11, an input unit 12, a communication unit 13, a storage unit 14, and an output unit 15 by executing a program.

More specifically, the processor 901 reads out a program stored in the storage unit 14 and causes the memory 902 to store the readout program. By the processor 901 executing the program stored in the memory 902, the server 1 functions as a device including the control unit 11, the input unit 12, the communication unit 13, the storage unit 14, and the output unit 15.

The control unit 11 controls the operations of various types of functional units included in the server 1 such as the input unit 12, the communication unit 13, the storage unit 14, and the output unit 15. The control unit 11 records, for example, various types of information in the storage unit 14. The control unit 11 executes, for example, a program for executing processing for user information (hereinafter referred to as an "application program").

The input unit 12 is configured to include input devices such as, mouse, a keyboard, and a touch panel. The input unit 12 may be configured as an interface that connects these input devices to the server 1. The input unit 12 accepts input of various types of information to the server 1.

The communication unit 13 is configured to include a communication interface for connecting the server 1 to an external device. The communication unit 13 communicates with an external device through wired or wireless connection. The external device is, for example, the terminal management device 5.

The storage unit 14 is configured using a computer readable storage medium device such as a magnetic hard disk device or a semiconductor storage device. The storage unit 14 stores various types of information relating to the server 1. The storage unit 14 stores, for example, information input through the input unit 12 or the communication unit 13. The storage unit 14 may store, for example, an application program in advance. The control unit 11 reads out an application program from the storage unit 14 and executes the application program.

The output unit 15 outputs various types of information. The output unit 15 is configured to include a display device such as, for example, a cathode ray tube (CRT) display, a liquid crystal display, or an organic electro-luminescence (EL) display. The output unit 15 may be configured as an interface that connects these display devices to the server 1. The output unit 15 outputs, for example, information input to the input unit 12.

Figure 4:
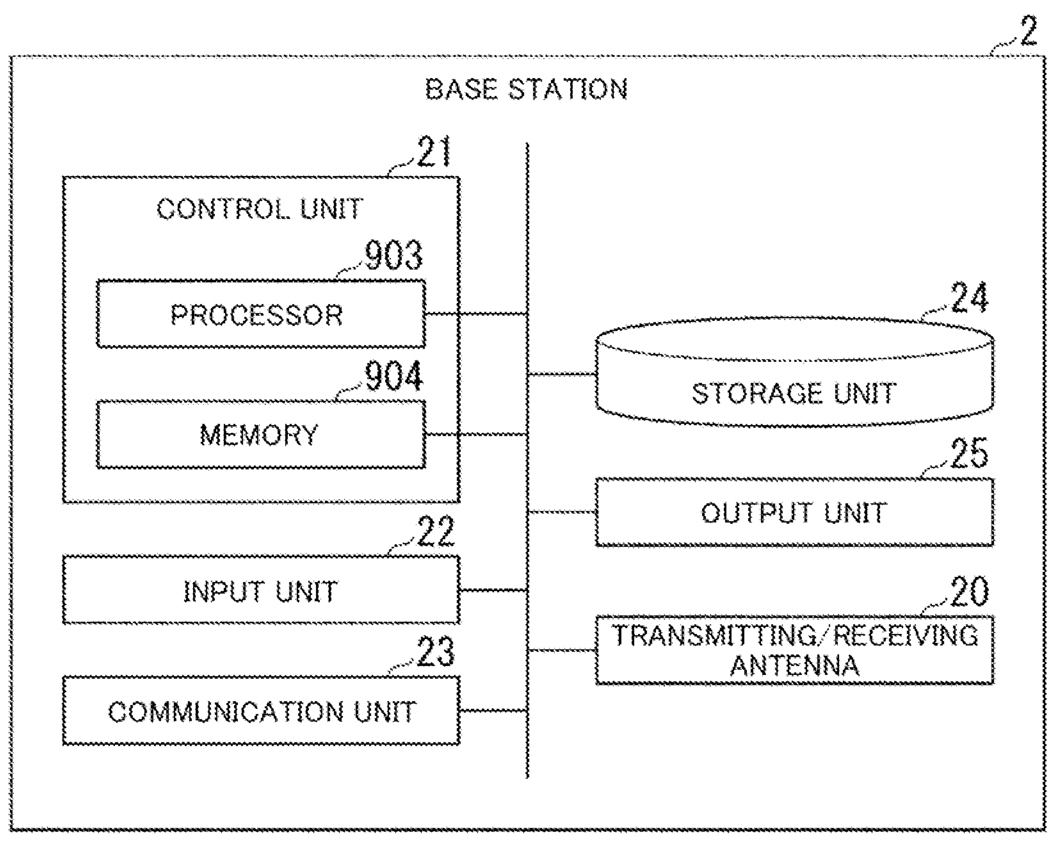
FIG. 4 is a diagram illustrating an example of a hardware configuration of a base station 2 in the first embodiment.

FIG. 4 is a diagram illustrating an example of a hardware configuration of the base station 2 in the first embodiment. The base station 2 includes a control unit 21 having a processor 903 such as a CPU and a memory 904 which are connected to each other through a bus, and executes a program. The base station 2 functions as a device including the control unit 21, an input unit 22, a communication unit 23, a storage unit 24, an output unit 25, and the transmitting/receiving antenna 20 by executing a program.

More specifically, the processor 903 reads out a program stored in the storage unit 24 and causes the memory 902 to store the readout program. By the processor 901 executing the program stored in the memory 902, the base station 2 functions as a device including the control unit 21, the input unit 22, the communication unit 23, the storage unit 24, the output unit 25, and the transmitting/receiving antenna 20.

The control unit 21 controls the operations of various types of functional units included in the base station 2 such as the input unit 22, the communication unit 23, the storage unit 24, the output unit 25, and the transmitting/receiving antenna 20. The control unit 21 records, for example, various types of information in the storage unit 24.

The control unit 21 executes, for example, an information extraction process. The information extraction process is a process of extracting terminal signal strength information from the measurement information report signal received by the transmitting/receiving antenna 20.

The control unit 21 executes, for example, the handover execution determination process. The handover process is executed in the control unit 21 included in the movement source base station. The terminal signal strength information used in the handover execution determination process is terminal signal strength information obtained through the information extraction process.

The control unit 21 executes, for example, the handover process. The handover process is executed not only by the control unit 21 included in the movement source base station but also by the control unit 21 included in the movement destination base station. The handover process is a process executed by the control unit 21 of the movement source base station and the control unit 21 of the movement destination base station in cooperation through the communication unit 23. The terminal signal strength information used in the handover process is terminal signal strength information obtained through the information extraction process.

The control unit 21 transmits, for example, the handover request information to the movement destination base station through the communication unit 23. More specifically, in the control unit 21 included in the movement source base station, a process of transmitting the handover request information to the movement destination base station through the communication unit 23 is executed.

The control unit 21 transmits, for example, the handover request information to the transfer management device 3 through the communication unit 23. More specifically, in the control unit 21 included in the movement source base station, a process of transmitting the handover request information to the transfer management device 3 through the communication unit 23 is executed.

The control unit 21 transmits, for example, user information included in the user signal received by the transmitting/receiving antenna 20 to the transfer device 40 through the communication unit 23. More specifically, in the control unit 21 of the base station 2 of current affiliation, a process of transmitting user information included in the user signal received by the transmitting/receiving antenna 20 to the transfer device 40 through the communication unit 23 is executed.

The control unit 21 transmits the user information, received from the transfer device 40 through the communication unit 23, to the wireless terminal 9 through the transmitting/receiving antenna 20. More specifically, in the control unit 21 of the base station 2 of current affiliation, a process of transmitting the user information, received through the communication unit 23, to the wireless terminal 9 through the transmitting/receiving antenna 20 is executed.

The control unit 21 transmits, for example, the route change request signal to the terminal management device 5 through the communication unit 23. More specifically, in the control unit 21 included in the movement destination base station, a process of transmitting the route change request signal to the terminal management device 5 through the communication unit 23 is executed.

The control unit 21 receives, for example, the route change response signal transmitted by the terminal management device 5 through the communication unit 23. More specifically, in the control unit 21 included in the movement destination base station, a process of receiving the route change response signal transmitted by the terminal management device 5 through the communication unit 23 is executed.

The control unit 21 of the movement destination base station transmits, for example, the context release command to the movement source base station through the communication unit 23.

The input unit 22 is configured to include input devices such as, mouse, a keyboard, and a touch panel. The input unit 22 may be configured as an interface that connects these input devices to the base station 2. The input unit 22 accepts input of various types of information to the base station 2.

The communication unit 23 is configured to include a communication interface for connecting the base station 2 to an external device. The communication unit 23 communicates with an external device through wired or wireless connection. The external device is, for example, the other base station 2. The external device is, for example, the transfer device 40. The external device is, for example, the transfer management device 3. The external device is, for example, the terminal management device 5.

The storage unit 24 is configured using a computer readable storage medium device such as a magnetic hard disk device or a semiconductor storage device. The storage unit 24 stores various types of information relating to the base station 2. The storage unit 24 stores, for example, information input through the input unit 22 or the communication unit 23. The storage unit 24 stores, for example, context information.

The storage unit 24 may store, for example, information on the movement source base station. The storage unit 24 may store, for example, information on the movement destination base station.

The output unit 25 outputs various types of information. The output unit 25 is configured to include a display device such as, for example, a CRT display, a liquid crystal display, or an organic EL display. The output unit 25 may be configured as an interface that connects these display devices to the base station 2. The output unit 25 outputs, for example, information input to the input unit 22.

Figure 5:
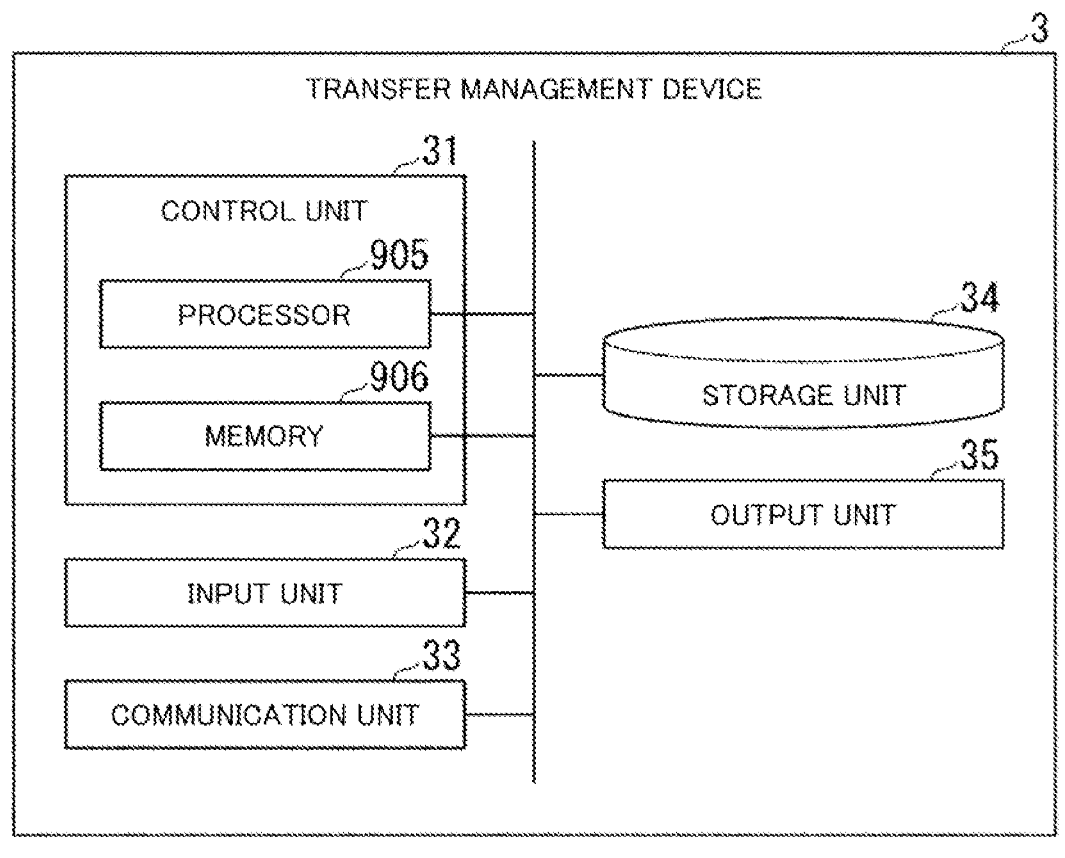
FIG. 5 is a diagram illustrating an example of a hardware configuration of a transfer management device 3 in the first embodiment.

FIG. 5 is a diagram illustrating an example of a hardware configuration of the transfer management device 3 in the first embodiment. The transfer management device 3 includes a control unit 31 having a processor 905 such as a CPU and a memory 906 which are connected to each other through a bus, and executes a program. The transfer management device 3 functions as a device including the control unit 31, an input unit 32, a communication unit 33, a storage unit 34, and an output unit 35 by executing a program.

More specifically, the processor 905 reads out a program stored in the storage unit 34 and causes the memory 906 to store the readout program. By the processor 905 executing the program stored in the memory 906, the transfer management device 3 functions as a device including the control unit 31, the input unit 32, the communication unit 33, the storage unit 34, and the output unit 35.

The control unit 31 controls the operations of various types of functional units included in the transfer management device 3 such as the input unit 32, the communication unit 33, the storage unit 34, and the output unit 35. The control unit 31 records, for example, various types of information in the storage unit 34.

The control unit 31 executes, for example, a first information reception process. The first information reception process is a process of receiving the handover request information. The control unit 31 executes, for example, the transfer route control process. In the transfer route control process, the control unit 31 controls the paths in the transfer device network 4 by controlling the operation of one or a plurality of transfer devices 40 included in the transfer device network 4 through the communication unit 33.

The input unit 32 is configured to include input devices such as, mouse, a keyboard, and a touch panel. The input unit 32 may be configured as an interface that connects these input devices to the transfer management device 3. The input unit 32 accepts input of various types of information to the transfer management device 3.

The communication unit 33 is configured to include communication interface for connecting the transfer management device 3 to an external device. The communication unit 33 communicates with an external device through wired or wireless connection. The external device is, for example, the base station 2. The external device is, for example, the transfer device 40.

The storage unit 34 is configured using a computer readable storage medium device such as a magnetic hard disk device or a semiconductor storage device. The storage unit 34 stores various types of information relating to the transfer management device 3. The storage unit 34 stores, for example, information input through the input unit 32 or the communication unit 33.

The output unit 35 outputs various types of information. The output unit 35 is configured to include a display device such as, for example, a CRT display, a liquid crystal display, or an organic EL display. The output unit 35 may be configured as an interface that connects these display devices to the transfer management device 3. The output unit 35 outputs, for example, information input to the input unit 32.

Figure 6:
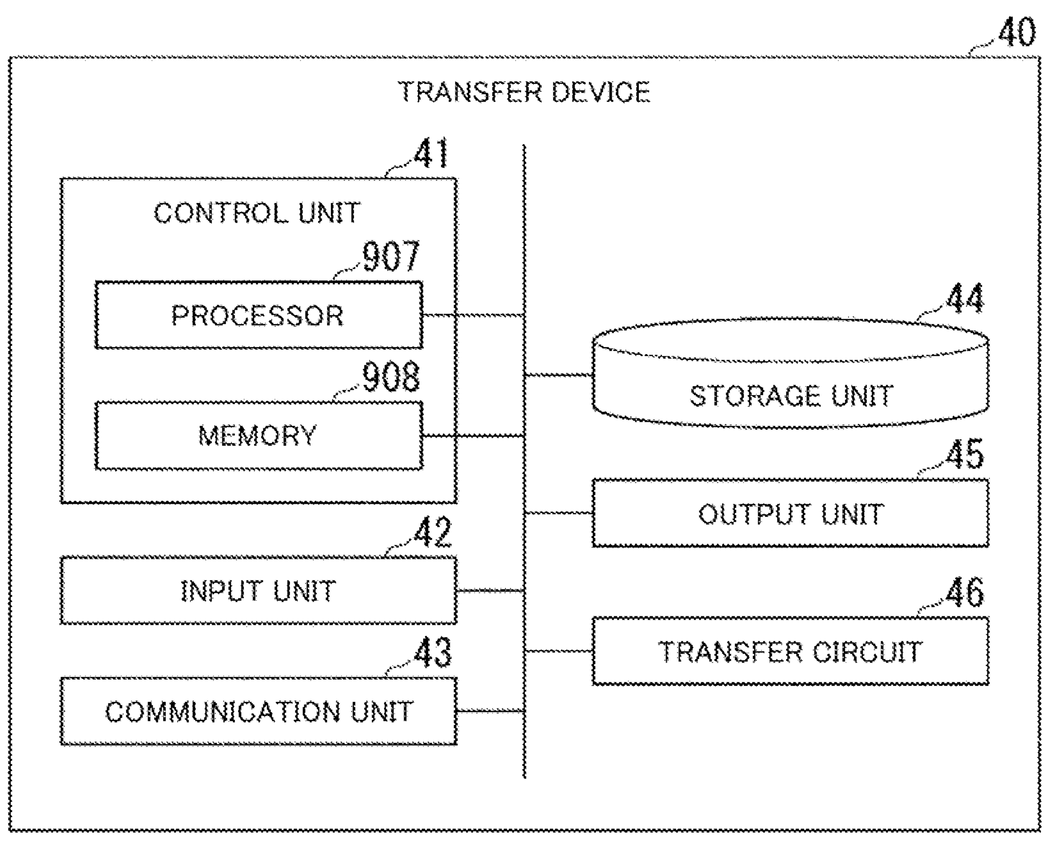
FIG. 6 is a diagram illustrating an example of a hardware configuration of a transfer device 40 in the first embodiment.

FIG. 6 is a diagram illustrating an example of a hardware configuration of the transfer device 40 in the first embodiment. The transfer device 40 includes a control unit 41 having a processor 907 such as a CPU and a memory 908 which are connected to each other through a bus, and executes a program. The transfer device 40 functions as a device including the control unit 41, an input unit 42, a communication unit 43, a storage unit 44, an output unit 45, and a transfer circuit 46 by executing a program.

More specifically, the processor 907 reads out a program stored in the storage unit 44 and causes the memory 908 to store the readout program. By the processor 907 executing the program stored in the memory 908, the transfer device 40 functions as a device including the control unit 41, the input unit 42, the communication unit 43, the storage unit 44, the output unit 45, and the transfer circuit 46.

The control unit 41 controls the operations of various types of functional units included in the transfer device 40 such as the input unit 42, the communication unit 43, the storage unit 44, the output unit 45, and the transfer circuit 46. The control unit 41 records, for example, various types of information in the storage unit 44. The control unit 41 changes, for example, the connection destination of the transfer circuit 46 in accordance with the control of the transfer management device 3.

The input unit 42 is configured to include input devices such as, mouse, a keyboard, and a touch panel. The input unit 42 may be configured as an interface that connects these input devices to the transfer device 40. The input unit 42 accepts input of various types of information to the transfer device 40.

The communication unit 43 is configured to include a communication interface for connecting the transfer device 40 to an external device. The communication unit 43 communicates with an external device through wired or wireless connection. The external device is, for example, the transfer management device 3. The external device is, for example, the terminal management device 5.

The storage unit 44 is configured using a computer readable storage medium device such as a magnetic hard disk device or a semiconductor storage device. The storage unit 44 stores various types of information relating to the transfer device 40. The storage unit 44 stores, for example, information input through the input unit 42 or the communication unit 43.

The output unit 45 outputs various types of information. The output unit 45 is configured to include a display device such as, for example, a CRT display, a liquid crystal display, or an organic EL display. The output unit 45 may be configured as an interface that connects these display devices to the transfer device 40. The output unit 45 outputs, for example, information input to the input unit 42.

The transfer circuit 46 is a circuit that transfers information. The transfer circuit 46 is a circuit configured to include an element that switches a circuit such as a switch and to be capable of switching the connection destination of the circuit. The control unit 41 controls the operation of an element that switches a circuit, so that the connection destination of the transfer circuit 46 is changed, and the path is changed or added.

Figure 7:
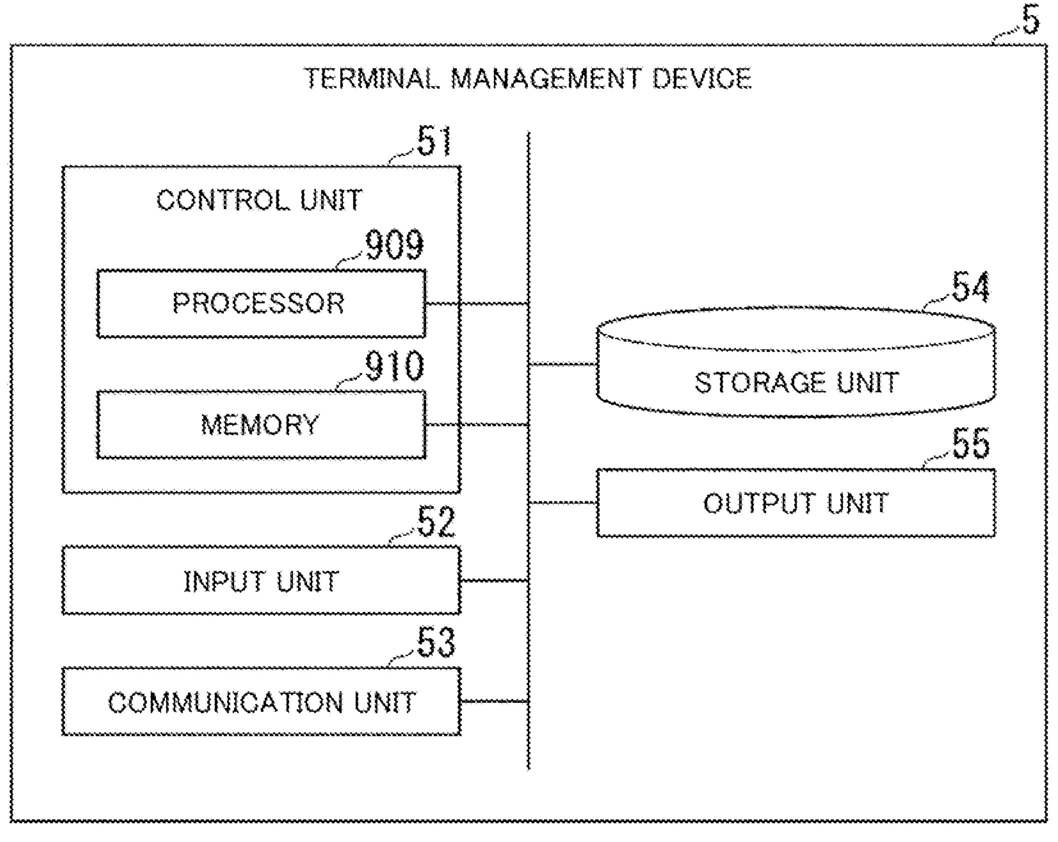
FIG. 7 is a diagram illustrating an example of a hardware configuration of a terminal management device 5 in the first embodiment.

FIG. 7 is a diagram illustrating an example of a hardware configuration of the terminal management device 5 in the first embodiment. The terminal management device 5 includes a control unit 51 having a processor 909 such as a CPU and a memory 910 which are connected to each other through a bus, and executes a program. The terminal management device 5 functions as a device including the control unit 51, an input unit 52, a communication unit 53, a storage unit 54, and an output unit 55 by executing a program.

More specifically, the processor 909 reads out a program stored in the storage unit 54 and causes the memory 910 to store the readout program. By the processor 909 executing the program stored in the memory 910, the terminal management device 5 functions as a device including the control unit 51, the input unit 52, the communication unit 53, the storage unit 54, and the output unit 55.

The control unit 51 controls the operations of various types of functional units included in the terminal management device 5 such as the input unit 52, the communication unit 53, the storage unit 54, and the output unit 55. The control unit 51 records, for example, various types of information in the storage unit 54. The control unit 51 executes, for example, the route change process. The control unit 51 transmits, for example, the route change response signal to the movement destination base station through the communication unit 53. The control unit 51 transmits, for example, user information received from the server 1 to the transfer device 40 through the communication unit 53. The control unit 51 transmits, for example, the user information received from the transfer device 40 to the server 1 through the communication unit 53.

The input unit 52 is configured to include input devices such as, mouse, a keyboard, and a touch panel. The input unit 52 may be configured as an interface that connects these input devices to the terminal management device 5. The input unit 52 accepts input of various types of information to the terminal management device 5.

The communication unit 53 is configured to include a communication interface for connecting the terminal management device 5 to an external device. The communication unit 53 communicates with an external device through wired or wireless connection. The external device is, for example, the base station 2. The external device is, for example, the server 1. The external device is, for example, the transfer device 40.

The storage unit 54 is configured using a computer readable storage medium device such as a magnetic hard disk device or a semiconductor storage device. The storage unit 54 stores various types of information relating to the terminal management device 5. The storage unit 54 stores, for example, information input through the input unit 52 or the communication unit 53.

The output unit 55 outputs various types of information. The output unit 55 is configured to include a display device such as, for example, a CRT display, a liquid crystal display, or an organic EL display. The output unit 55 may be configured as an interface that connects these display devices to the terminal management device 5. The output unit 55 outputs, for example, information input to the input unit 52.

In the wireless communication system 100 of the first embodiment configured in this way, the handover request information is also transferred from the base station 2 of current affiliation to the transfer management device 3 before the completion of the handover process. Thus, the wireless communication system 100 can reduce the time required to form a path.

For example, it is assumed that the transmission distance between the transfer device 40 and the transfer management device 3 is 100 km and the processing time for forming a new path is 0.5 ms. The case of a transmission distance of 100 km, the propagation delay required for the transfer route control process is assumed to be 1.5 ms. In that case, it takes a total of 2 ms to form a path. In a case where the process of step S104 is executed after the execution of the handover process, no other process is executed during this 2 ms, and thus a communication delay of 2 ms occurs as it is. However, in the case of the wireless communication system 100, other processes are also executed during this 2 ms, and thus it is possible to reduce the maximum delay of 2 ms.

Modification Example of First Embodiment

Meanwhile, as described above, the base station 2 includes the transmitting/receiving antenna 20 and transmits and receives signals to and from the wireless terminal 9. Thus, the base station 2 is an example of an end wireless device which is a wireless device that includes the transmitting/receiving antenna 20 and transmits and receives signals to and from the wireless terminal 9 through the transmitting/receiving antenna 20.

Meanwhile, as described above, the terminal signal strength is the strength of a signal received by the wireless terminal 9 and transmitted by the transmitting/receiving antenna 20. Thus, the terminal signal strength information which is information indicating the terminal signal strength is an example of information indicating the status of communication between the wireless terminal 9 and the end wireless device (hereinafter referred to as "communication status information").

Meanwhile, as described above, the handover process is executed in a case where it is determined that the base station 2 satisfying the terminal signal strength condition has been changed as a result of the execution of the handover execution determination process. The terminal signal strength information is then used in the handover execution determination process. In addition, the handover process is a process of controlling the operations of the movement source base station and the movement destination base station so that the movement destination base station starts operating as the movement source base station. Thus, the handover process is an example of a process of controlling the operation of the end wireless device regarding communication between the end wireless device and the wireless terminal 9 on the basis of communication status information (hereinafter referred to as a "switching process").

Meanwhile, as described above, the control unit 21 included in the base station 2 executes the handover process. Thus, the control unit 21 included in the base station 2 is an example of an end communication control unit which is a functional unit that executes the switching process.

Meanwhile, as described above, the handover request information is information indicating that the base station 2 satisfying the terminal signal strength condition has been changed from the base station 2 of current affiliation to the other base station 2 and the base station 2 which is a change destination. Therefore, the handover request information is information relating to the status of communication between the wireless terminal 9 and the base station 2 and information indicating the base station 2 with which the wireless terminal 9 is affiliated. Thus, the handover request information is an example of the communication status information.

Meanwhile, as described above, the control unit 31 included in the transfer management device 3 executes the transfer route control process in a case where the handover request information is received. The handover request information is an example of the communication status information, and the transfer route control process is a process of controlling paths between the plurality of transfer devices 40 on the basis of the received handover request information as shown in the process of step S106. Therefore, in a case where the communication status information is received, the control unit 31 included in the transfer management device 3 is an example of a functional unit that controls paths between the plurality of transfer devices 40 on the basis of the received communication status information (hereinafter referred to as a "transfer route control unit").

Meanwhile, as described above, the handover execution determination process is a process of determining the base station 2 satisfying the terminal signal strength condition on the basis of the terminal signal strength information and determining whether the handover process is executed. The base station 2 satisfying the terminal signal strength condition is an end wireless device which is a change destination of affiliation.

Therefore, the handover execution determination process is an example of a switching execution determination process which is a process of determining an end wireless device that is a switching destination on the basis of the terminal signal strength information and determining whether the switching process is executed.

Second Embodiment

Figure 8:
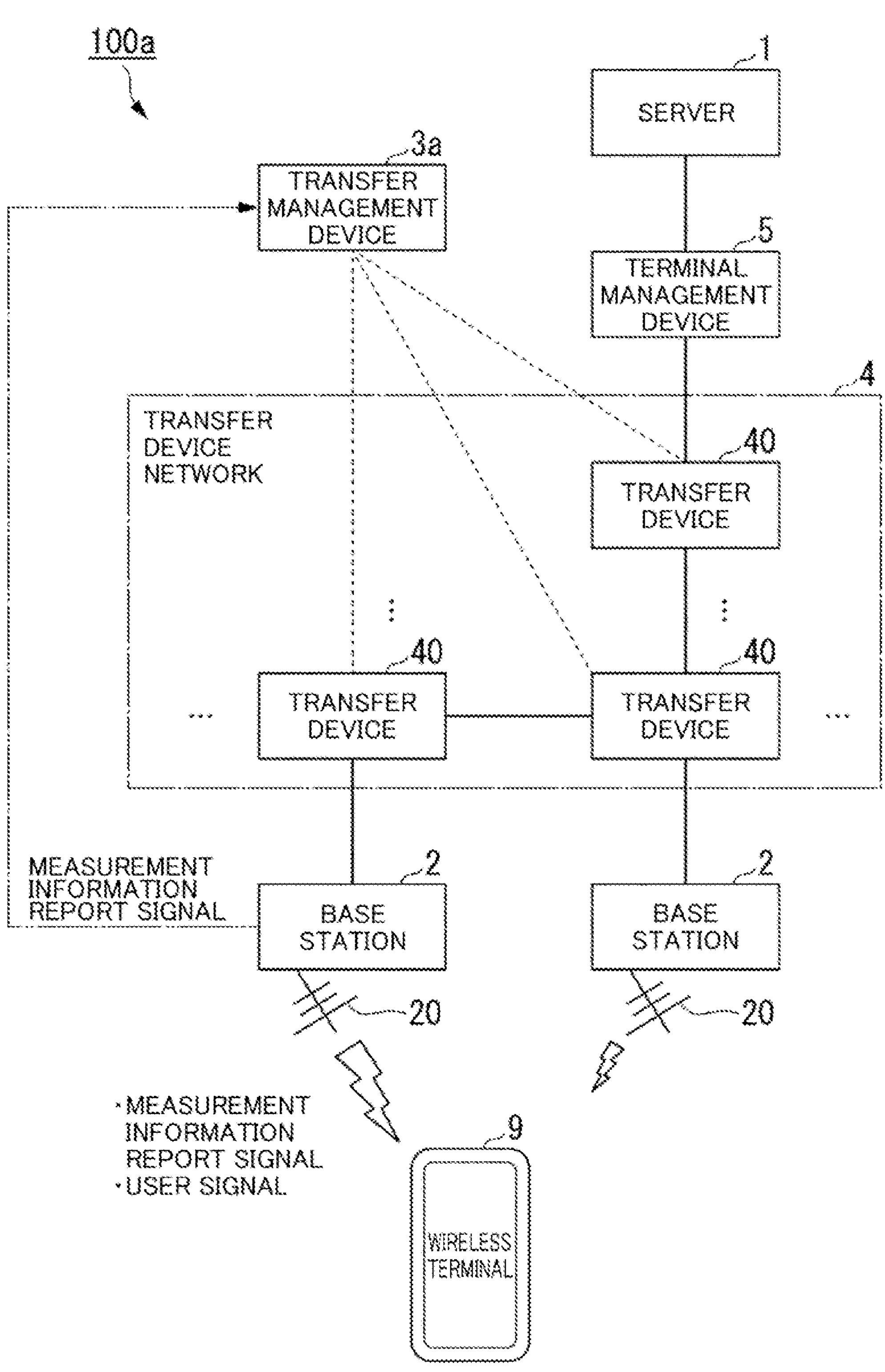
FIG. 8 is a diagram illustrating an example of a configuration of a wireless communication system 100*a* of a second embodiment.

FIG. 8 is a diagram illustrating an example of a configuration of a wireless communication system **100*a* of a second embodiment. For the sake of simplicity of the following description, components having the same functions as the functional units included in the wireless communication system 100 of the first embodiment are denoted by the same reference numerals and signs as in FIGS. 1 to 7**, and thus description thereof will be omitted.

The wireless communication system **100*a* differs from the wireless communication system 100 in that a transfer management device 3*a* is provided instead of the transfer management device 3 and that a signal received by the transfer management device 3*a*** is the measurement information report signal instead of the handover request information.

More specifically, the transfer management device **3*a* differs from the transfer management device 3 in that the measurement information report signal is received from the base station 2 instead of the handover request information. In addition, the transfer management device 3*a* executes the transfer route control process on the basis of the received measurement information report signal. Specifically, the transfer management device 3*a*** executes the handover execution determination process and executes the transfer route control process on the basis of the result of the executed handover execution determination process.

That is, the transfer management device **3*a* differs from the transfer management device 3 in that the transfer management device 3*a* does not acquire the result of the handover execution determination process from the base station 2** but acquires the result of the handover execution determination process by executing the handover execution determination process.

Figure 9:
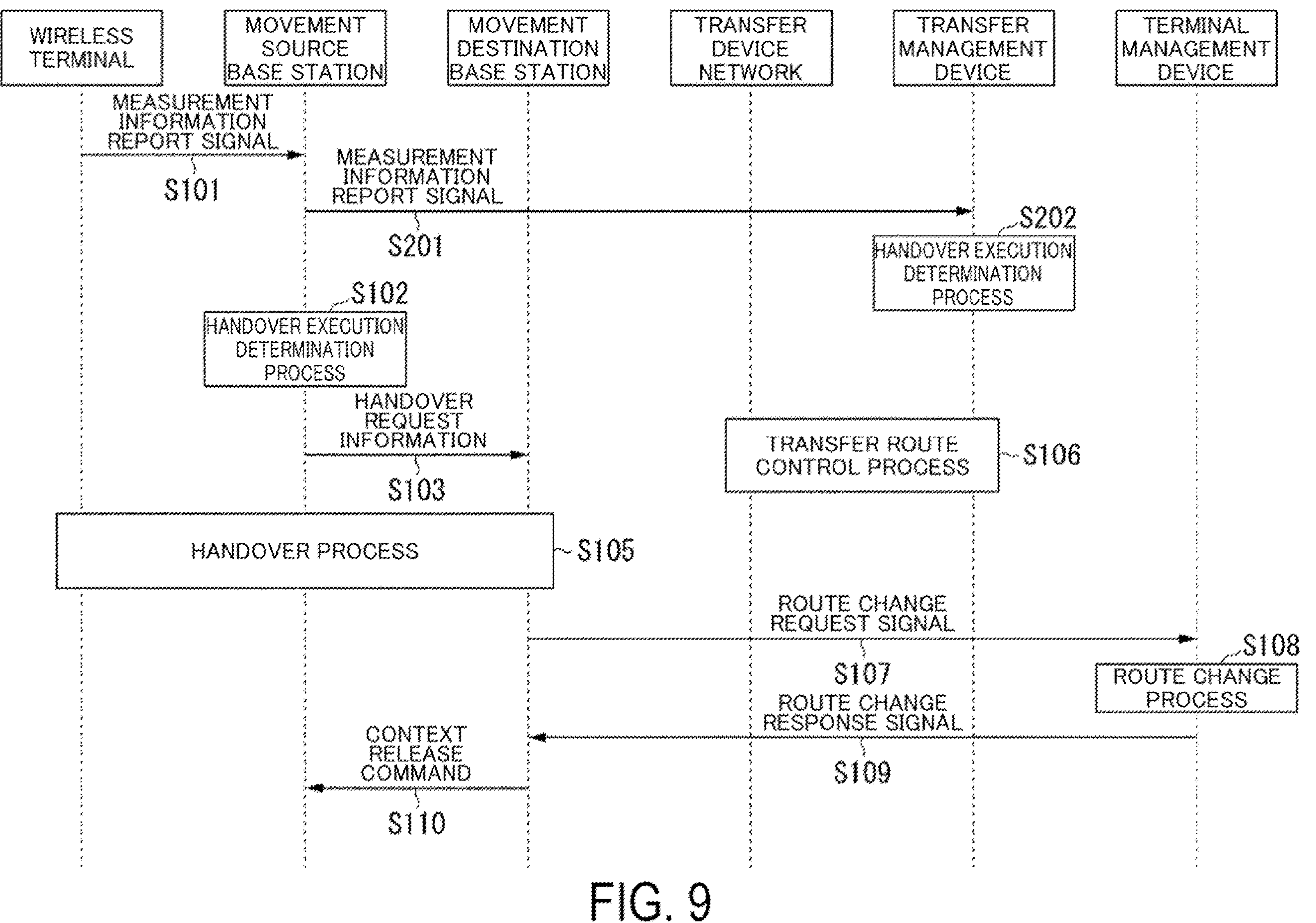
FIG. 9 is a sequence diagram illustrating an example of a flow of processing executed by the wireless communication system 100*a* of the second embodiment.

FIG. 9 is a sequence diagram illustrating an example of a flow of processing executed by the wireless communication system **100*a* of the second embodiment. More specifically, FIG. 9 is a diagram illustrating an example of a flow of processing executed by the wireless communication system 100*a*, taking as an example a case where the result of the handover execution determination process is a result that the affiliation needs to be changed. Hereinafter, the same processes as the processes described in FIG. 2 are denoted by the same reference numerals and signs as in FIG. 2**, and thus description thereof will be omitted.

In the wireless communication system 100*a*, after the process of step S101, the transfer management device 3*a* executes a process of receiving the measurement information report signal from the movement source base station (step S201). Next, the transfer management device 3*a* executes the handover execution determination process (step S202). Next, the transfer management device 3*a* executes the transfer route control process (step S106).

In addition, the process of step S102 is executed during the execution of step S106. Meanwhile, the process of step S201 may be performed at any timing before the completion of the handover execution determination process performed by the movement source base station. Meanwhile, the process of step S201 may be executed before the process of step S101 is executed, or may be executed at the same timing as the process of step S101.

As shown in the sequence diagram of FIG. 9, in the wireless communication system 100*a*, the measurement information report signal is also transferred from the movement source base station to the transfer management device 3*a*. The timing is before the completion of the handover execution determination process performed by the movement source base station. Therefore, in the wireless communication system 100*a*, the execution of the handover process and the execution of the transfer route control process can be executed simultaneously.

Figure 10:
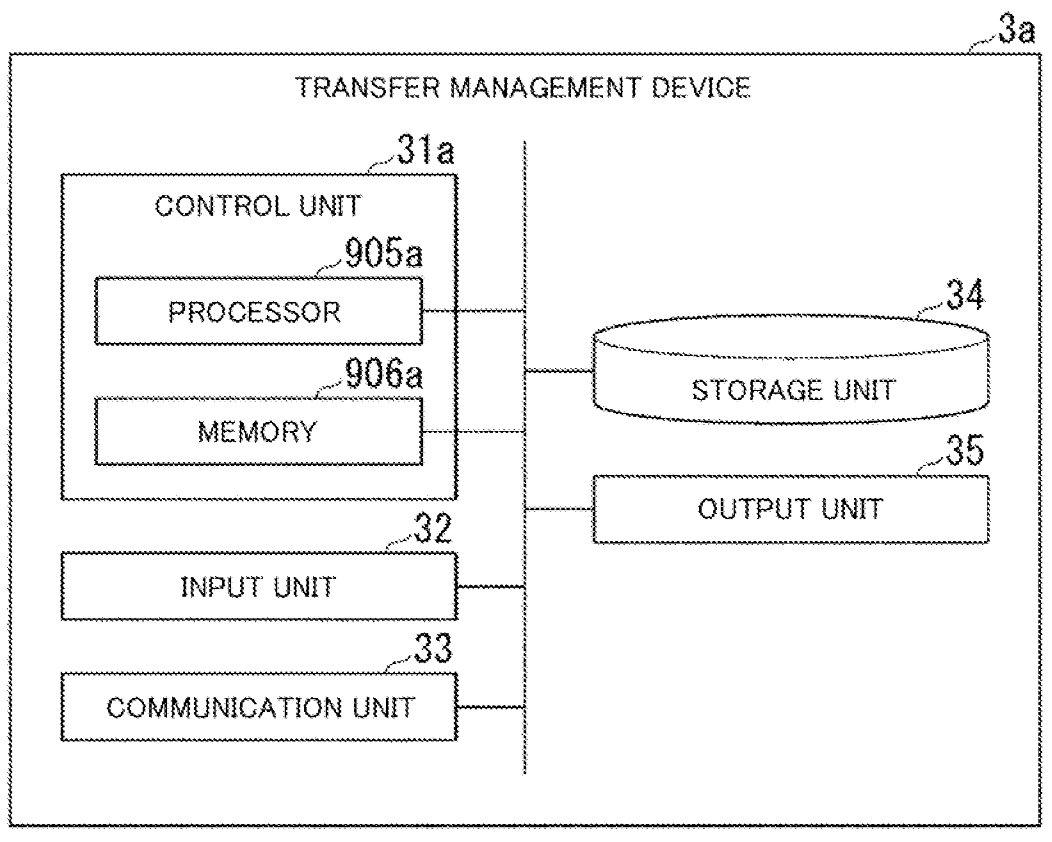
FIG. 10 is a diagram illustrating an example of a hardware configuration of a transfer management device 3*a* in the second embodiment.

FIG. 10 is a diagram illustrating an example of a hardware configuration of the transfer management device 3*a* in the second embodiment. The transfer management device 3*a* includes a control unit 31*a* having a processor 905*a* such as a CPU and a memory 906*a* which are connected to each other through a bus, and executes a program. The transfer management device 3*a* functions as a device including the control unit 31*a*, the input unit 32, the communication unit 33, the storage unit 34, and the output unit 35 by executing a program.

More specifically, the processor 905*a* reads out a program stored in the storage unit 34 and causes the memory 906*a* to store the readout program. By the processor 905*a* executing the program stored in the memory 906*a*, the transfer management device 3*a* functions as a device including the control unit 31*a*, the input unit 32, the communication unit 33, the storage unit 34, and the output unit 35.

The control unit 31*a* controls the operations of various types of functional units included in the transfer management device 3*a* such as the input unit 32, the communication unit 33, the storage unit 34, and the output unit 35. The control unit 31*a* records, for example, various types of information in the storage unit 34.

The control unit 31*a* executes, for example, a second information reception process. The second information reception process is a process of receiving the measurement information report signal from the movement source base station through the communication unit 33. The control unit 31*a* executes, for example, the handover execution determination process. The control unit 31*a* executes, for example, the transfer route control process. In the transfer route control process, the control unit 31*a* controls the paths in the transfer device network 4 by controlling the operation of one or a plurality of transfer devices 40 included in the transfer device network 4 through the communication unit 33.

In this way, in the wireless communication system 100*a* of the second embodiment, the process of step S201 is executed before the completion of the handover execution determination process. Thus, the wireless communication system 100*a* can reduce the time required to form a path even more than the wireless communication system 100.

Modification Example of Second Embodiment

Meanwhile, as described above, the transfer management device 3*a* receives the measurement information report signal transmitted by the movement source base station. The transfer management device 3*a* then executes the handover execution determination process on the basis of the terminal signal strength information which is information indicated by the received measurement information report signal, and executes the transfer route control process using the execution result. That is, the transfer management device 3*a* executes the transfer route control process on the basis of the received terminal signal strength information. Thus, the transfer management device 3*a* is an example of the transfer route control unit.

Third Embodiment

In the wireless communication system 100 and the wireless communication system 100*a*, communication between the base station 2 and the wireless terminal 9 was simply an exchange of radio waves, and there was no other communication device therebetween. However, in the wireless communication system 100 and the wireless communication system 100*a*, the functions of the base station 2 may be separated. With one being a central station and the other being a distributed station, communication may be performed between the central station and the wireless terminal 9 through the distributed station.

For example, in a case where the functions of the base station 2 are a central unit (CU) and a distributed unit (DU) in the communication standard of mobile communication, the central station has a function of the CU, and the distributed station has a function of the DU. For example, in a case where the functions of the base station 2 are a DU and a radio unit (RU) in the communication standard of mobile communication, the central station may have a function of the DU, and the distributed station may have a function of the RU.

In addition, for example, in a case where the functions of the base station 2 are a CU, a DU, and an RU in the communication standard of mobile communication, the central station may have functions of the CU and the DU, and the distributed station may have a function of the RU. In any of these cases, in the wireless communication system 100, communication in which the central station and the wireless terminal 9 exchange signals through the distributed station is executed instead of communication between the base station 2 and the wireless terminal 9.

In the following third embodiment, an example of a wireless communication system (hereinafter referred to as a "wireless communication system 100*b*") in which the central station and the wireless terminal 9 exchange signals through the distributed station will be described in more detail.

Meanwhile, the wireless terminal 9 transmits and receives user information to and from, for example, the server 1 through the wireless communication system 100*b*. Therefore, the wireless communication system 100*b* is, for example, a system included in the wireless communication system 100 and the wireless communication system 100*a*. However, the wireless communication system 100*b* is not necessarily included in the wireless communication system

100 and the wireless communication system 100*a*. The wireless communication system 100*b* may be included in any wireless communication system insofar as it is included in a wireless communication system that transmits and receives user information to and from the wireless terminal 9.

Figure 11:
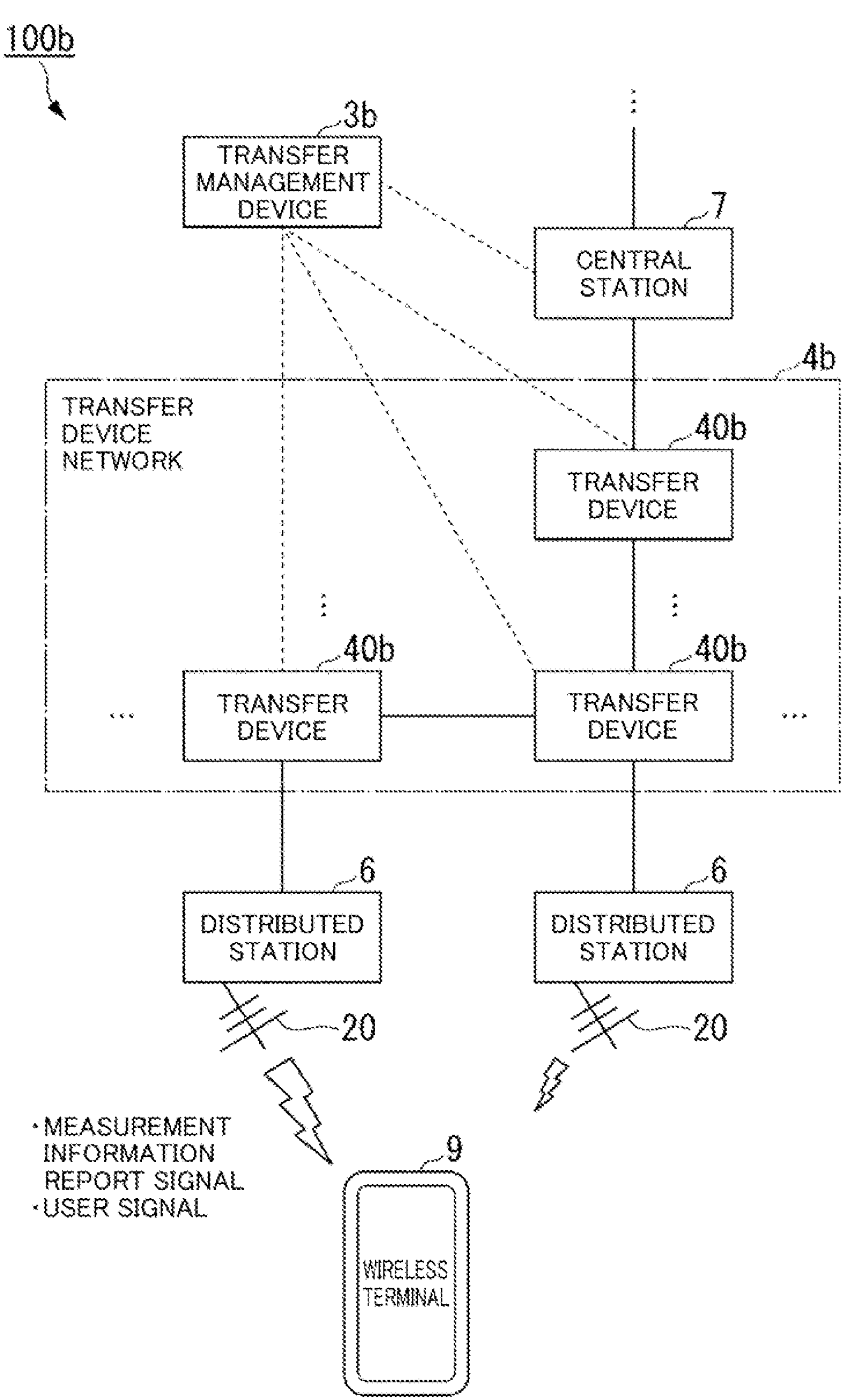
FIG. 11 is a diagram illustrating an example of a configuration of a wireless communication system 100*b* of a third embodiment.

FIG. 11 is a diagram illustrating an example of a configuration of the wireless communication system 100*b* of the third embodiment. For the sake of simplicity of the following description, components having the same functions as the functional units included in the wireless communication system 100 of the first embodiment are denoted by the same reference numerals and signs as in FIGS. 1 to 7, and thus description thereof will be omitted.

The wireless communication system 100*b* includes a distributed station 6, a central station 7, a transfer management device 3*b*, and a transfer device network 4*b*.

The distributed station 6 transmits and receives signals to and from the wireless terminal 9. The distributed station 6 has the transmitting/receiving antenna 20 and exchanges radio waves with the wireless terminal 9 through the transmitting/receiving antenna 20. One of the signals transmitted and received by the distributed station 6 to and from the wireless terminal 9 is a user signal.

The distributed station 6 receives the measurement information report signal from the wireless terminal 9. In the wireless communication system 100*b*, unlike the wireless communication system 100 and the wireless communication system 100*a*, the device including the transmitting/receiving antenna 20 is not the base station 2 but the distributed station 6. Therefore, the measurement information report signal indicates the terminal signal strength of at least the distributed station 6 with which the wireless terminal 9 is affiliated and the distributed station 6 that is a candidate for a change destination of affiliation.

The distributed station 6 transmits the received measurement information report signal to the central station 7. The distributed station 6 with which the wireless terminal 9 is affiliated receives the user signal transmitted by the wireless terminal 9. In addition, the distributed station 6 with which the wireless terminal 9 is affiliated transmits the user signal to the wireless terminal 9. The distributed station 6 with which the wireless terminal 9 is affiliated is a distributed station that satisfies the terminal signal strength condition. The terminal signal strength condition is, for example, a condition that the terminal signal strength is maximum. That is, in a case where the content of the terminal signal strength condition is a condition that the terminal signal strength is maximum, the distributed station 6 having a higher terminal signal strength than the other distributed station 6 is the distributed station 6 with which the wireless terminal 9 is affiliated.

For the same reason as in the description of the base station 2 that is a candidate for a change destination of affiliation described above, the distributed station 6 that is a candidate for a change destination of affiliation is, for example, a distributed station 6 which is spatially adjacent to the distributed station 6 of current affiliation. Hereinafter, the distributed station 6 of current affiliation is referred to as a movement source distributed station. Hereinafter, the distributed station 6 that is a change destination of affiliation is referred to as a movement destination distributed station.

In this way, the distributed station 6 includes the transmitting/receiving antenna 20 and transmits and receives signals to and from the wireless terminal 9. Thus, the distributed station 6 is an example of an end wireless device.

The movement source distributed station (that is, the distributed station 6 of current affiliation) executes the switching process on the basis of the terminal signal strength information.

The central station 7 executes the switching execution determination process. The central station 7 is connected to a transfer device 40*b*. The central station 7 transmits user information received from the transfer device 40*b* to a predetermined transmission destination. The predetermined transmission destination is, for example, the transfer device 40 in the first embodiment and the second embodiment. The central station 7 transmits the user information transmitted from the predetermined transmission source to the transfer device 40. The predetermined transmission source is, for example, the transfer device 40 in the first embodiment and the second embodiment.

The transfer management device 3*b* manages the transfer device network 4*b*. The transfer device network 4*b* includes a plurality of transfer devices 40*b*. The transfer device network 4*b* is bi-directional and uses some or all of the plurality of transfer devices 40*b* to transfer a signal input to the transfer device network 4*b* by the transfer source to the transfer destination. The transfer device 40*b* is a device that outputs the input signal to the output destination. More specifically, the transfer device 40*b* is a transfer device that transfers signals which are transmitted and received by the distributed station 6 and the central station 7.

An example of a set of transfer source and transfer destination of the transfer device network 4*b* is the distributed station 6 and the central station 7. Since the transfer device network 4*b* is bi-directional, the roles of the transfer source and the transfer destination are reversed when the direction of the signal flow is reversed. Therefore, the set of the central station 7 and the distributed station 6 is also an example of a set of the transfer source and the transfer destination of the transfer device network 4*b*.

A signal propagated from the distributed station 6 to the transfer device 40*b* is a user signal transmitted by the wireless terminal 9. In addition, a signal transferred to the distributed station 6 by the transfer device 40*b* is a user signal transmitted by a transmission source such as the server 1. Thus, the transfer device 40*b* is a device that transfers signals which are transmitted and received by the wireless terminal 9 and the distributed station 6.

The management of the transfer device network 4*b* performed by the transfer management device 3*b* will be described more specifically. The transfer management device 3*b* executes the transfer route control process for the transfer device network 4*b* on the basis of the result of determination of the switching execution determination process performed by the central station 7.

Since the transfer management device 3*b* executes the transfer route control process for the transfer device network 4*b*, the control target of the transfer route control process is a path in the transfer device network 4*b*. Therefore, the transfer management device 3*b* controls the paths in the transfer device network 4*b* by controlling the operation of the transfer device 40*b* through the execution of the transfer route control process.

Figure 12:
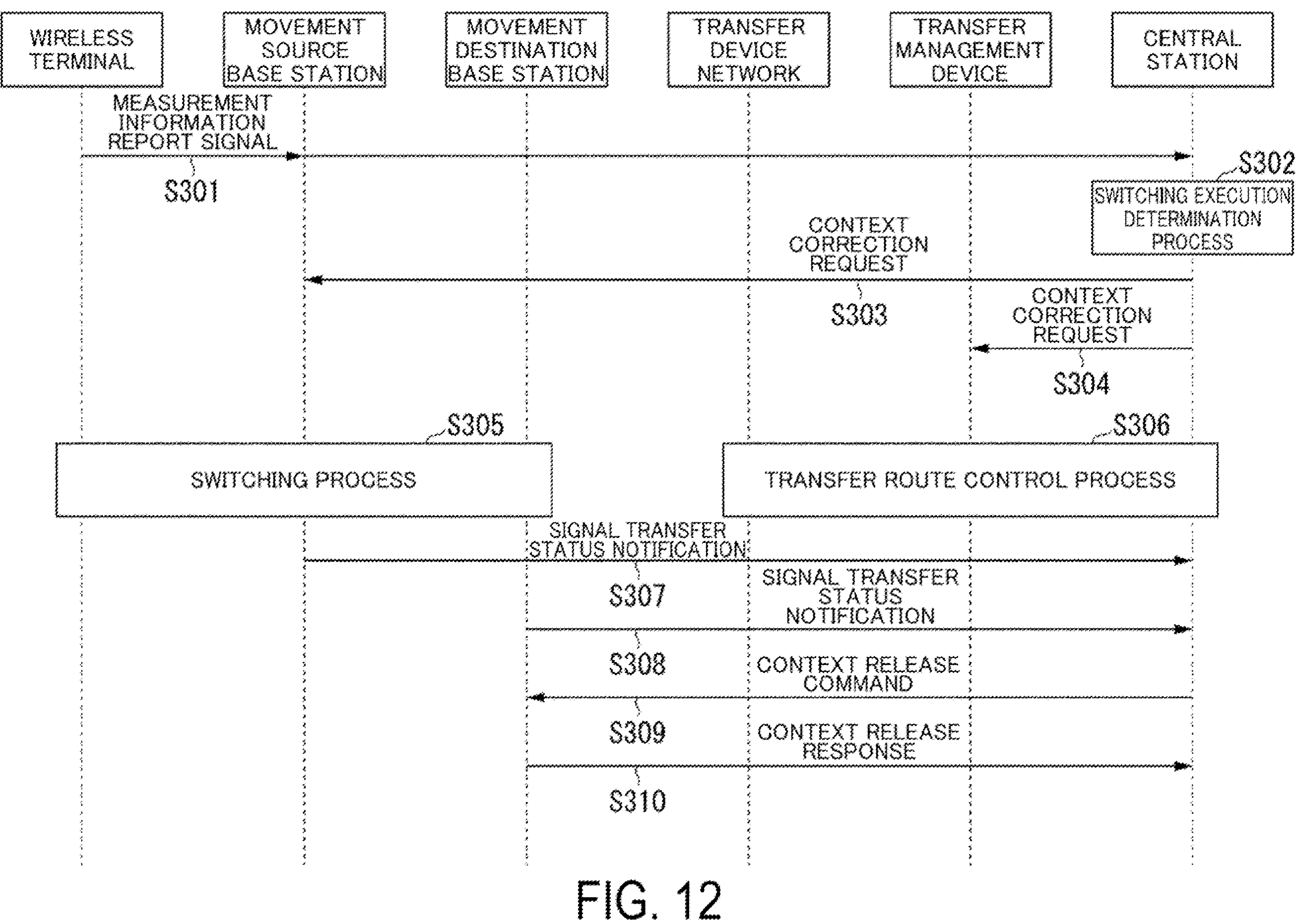
FIG. 12 is a sequence diagram illustrating an example of a flow of processing executed by the wireless communication system 100*b* of the third embodiment.

FIG. 12 is a sequence diagram illustrating an example of a flow of processing executed by the wireless communication system 100*b* of the third embodiment. More specifically, FIG. 12 is a diagram illustrating an example of a flow of processing executed by the wireless communication system 100*b*, taking as an example a case where the result of the switching execution determination process is a result that the switching process needs to be executed. Meanwhile, the need to execute the switching process means that it is determined by the execution of the switching execution determination process that the distributed station 6 satisfying the terminal signal strength condition is the other distributed station 6 different from the distributed station 6 of current affiliation.

The central station 7 receives the measurement information report signal transmitted by the wireless terminal 9 through the movement source distributed station (step S301). Specifically, the movement source distributed station receives the measurement information report signal transmitted by the wireless terminal 9, and the movement source distributed station transmits the received measurement information report signal to the central station 7. The central station 7 receives the measurement information report signal sent from the movement source distributed station.

Next, the central station 7 executes the switching execution determination process (step S302). Next, the central station 7 transmits information indicating the result of execution of the switching execution determination process (hereinafter referred to as a "context correction request") to the movement source distributed station (step S303). The movement source distributed station receives the transmitted context correction request.

Next, the central station 7 also transmits the context correction request to the transfer management device 3*b* (step S304). The transfer management device 3*b* receives the transmitted context correction request. Next, the switching process is executed by the wireless terminal 9, the movement source distributed station, and the movement destination distributed station (step S305).

The process of step S304 may be executed at any timing insofar as it is executed after the execution of step S302 and before the completion of step S305. For example, the process of step S304 may be executed before the execution of step S305. Therefore, the transfer management device 3*b* receives the context correction request before the execution of step S305 is completed. This effect (hereinafter referred to as a "second advance effect") will be described later.

The transfer management device 3*b* that has received the context correction request executes the transfer route control process for the transfer device network 4*b* (step S306). In the transfer route control process executed in the process of step S306, the paths between the plurality of transfer devices 40*b* are controlled on the basis of the received context correction request.

As described above, the transfer management device 3*b* receives the context correction request before the execution of step S305 is completed. Thus, the transfer management device 3*b* can execute the transfer route control process before the completion of the switching process.

After the execution of the switching process is completed, the movement destination distributed station transmits a signal transfer status notification to the central station 7 (step S307). The signal transfer status notification is information for notifying of the status of signal transfer. The signal transfer status notification indicates, for example, how far the user signal is transferred to the movement source distributed station and from where the user signal is to be transferred to the movement destination distributed station. Next, the movement source distributed station also transmits the signal transfer status notification to the central station 7 (step S308). Meanwhile, step S307 and step S308 may be performed in order such that step S308 is executed first and step S307 is executed next.

Next, the central station 7 transmits a context release command to the movement destination distributed station (step S309). Next, the movement destination distributed station transmits a context release response which is a signal indicating reception of the context release command to the central station 7 (step S310).

Meanwhile, in FIG. 12, an example of a flow of processing executed by the wireless communication system 100*b* has been described taking as an example a case where the result of the switching execution determination process is a result that the affiliation needs to be changed. In a case where the result of the switching execution determination process is not the result that the affiliation needs to be changed, the flow returns to the process of step S301 after step S302.

Second Advance Effect

The second advance effect will be described. As shown in the sequence diagram of FIG. 12, in the wireless communication system 100*b*, the context correction request is also transmitted from the central station 7 to the transfer management device 3*b*. The timing is before the completion of the switching process of step S305. Therefore, the switching process of step S305 and the transfer route control process of step S306 can be executed simultaneously.

In a case where the process of step S304 is executed after the execution of the switching process, the switching process and the transfer route control process of step S306 are not executed simultaneously. Therefore, in a case where the process of step S304 is executed after the execution of the switching process of step S305, it takes more time to form a path than the processing shown in the sequence diagram of FIG. 12.

Conversely, in the wireless communication system 100*b*, the context correction request is received by the transfer management device 3*b* before the switching in step S304 is completed, and thus it is possible to reduce the time required to form a path. This effect is the second advance effect.

Figure 13:
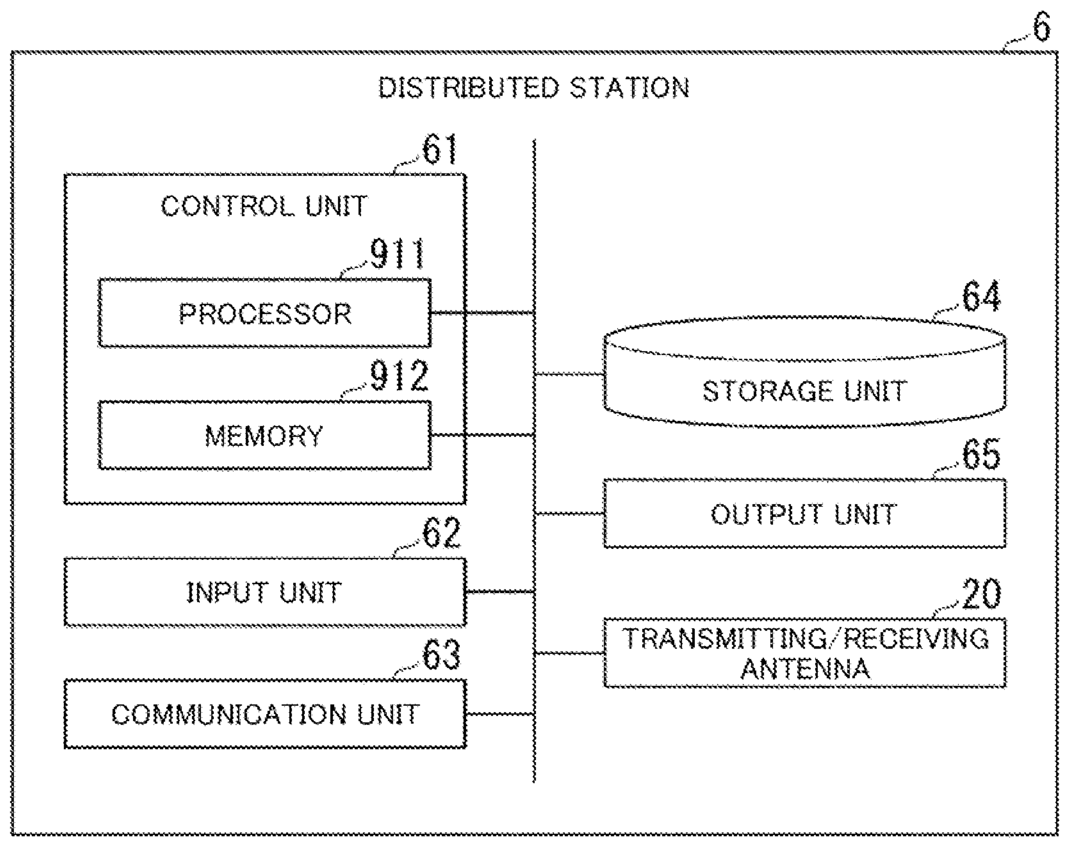
FIG. 13 is a diagram illustrating an example of a hardware configuration of a distributed station 6 in the third embodiment.

FIG. 13 is a diagram illustrating an example of a hardware configuration of the distributed station 6 in the third embodiment. The distributed station 6 includes a control unit 61 having a processor 911 such as a CPU and a memory 912 which are connected to each other through a bus, and executes a program. The distributed station 6 functions as a device including the control unit 61, an input unit 62, a communication unit 63, a storage unit 64, an output unit 65, and the transmitting/receiving antenna 20 by executing a program.

More specifically, the processor 911 reads out a program stored in the storage unit 64 and causes the memory 912 to store the readout program. By the processor 911 executing the program stored in the memory 912, the distributed station 6 functions as a device including the control unit 61, the input unit 62, the communication unit 63, the storage unit 64, the output unit 65, and the transmitting/receiving antenna 20.

The control unit 61 controls the operations of various types of functional units included in the distributed station 6 such as the input unit 62, the communication unit 63, the storage unit 64, the output unit 65, and the transmitting/receiving antenna 20. The control unit 61 records, for example, various types of information in the storage unit 64.

The control unit 61 executes, for example, the switching process. The switching process is executed not only by the control unit 61 included in the movement source distributed station but also by the control unit 61 included in the movement destination distributed station. The switching process is a process executed by the control unit 61 of the movement source distributed station and the control unit 61 of the movement destination distributed station in cooperation through the communication unit 63.

The control unit 61 transmits, for example, the measurement information report signal to the central station 7 through the communication unit 63. More specifically, in the control unit 61 included in the movement source distributed station, a process of transmitting the measurement information report signal to the central station 7 through the communication unit 63 is executed.

The control unit 61 receives, for example, the context correction request through the communication unit 63. More specifically, in the control unit 61 included in the movement source distributed station, a process of receiving the context correction request through the communication unit 63 is executed.

The control unit 61 transmits for example, the signal transfer status notification to the central station 7 through the communication unit 63. More specifically, in the control unit 61 included in the movement source distributed station and the movement destination distributed station, a process of transmitting the signal transfer status notification to the central station 7 through the communication unit 63 is executed.

The control unit 61 receives, for example, the context release command through the communication unit 63. More specifically, in the control unit 61 included in the movement destination distributed station, a process of receiving the context release command through the communication unit 63 is executed.

The control unit 61 transmits, for example, the context release response to the central station 7 through the communication unit 63. More specifically, in the control unit 61 included in the movement destination distributed station, a process of transmitting the context release response to the central station 7 through the communication unit 63 is executed.

The control unit 61 transmits the user information included in the user signal received by the transmitting/receiving antenna 20, for example, to the transfer device 40*b* through the communication unit 63. More specifically, in the control unit 61 of the distributed station 6 of current affiliation, a process of transmitting the user information included in the user signal received by the transmitting/receiving antenna 20 to the transfer device 40*b* through the communication unit 63 is executed.

The control unit 61 transmits the user information, received from the transfer device 40*b* through the communication unit 63, to the wireless terminal 9 through the transmitting/receiving antenna 20. More specifically, in the control unit 61 of the distributed station 6 of current affiliation, a process of transmitting the user information, received through the communication unit 63, to the wireless terminal 9 through the transmitting/receiving antenna 20 is executed.

The input unit 62 is configured to include input devices such as, mouse, a keyboard, and a touch panel. The input unit 62 may be configured as an interface that connects these input devices to the distributed station 6. The input unit 62 accepts input of various types of information to the distributed station 6.

The communication unit 63 is configured to include a communication interface for connecting the distributed station 6 to an external device. The communication unit 63 communicates with an external device through wired or wireless connection. The external device is, for example, the other distributed station 6. The external device is, for example, the transfer device 40*b*.

The storage unit 64 is configured using a computer readable storage medium device such as a magnetic hard disk device or a semiconductor storage device. The storage unit 64 stores various types of information relating to the distributed station 6. The storage unit 64 stores, for example, information input through the input unit 62 or the communication unit 63. The storage unit 64 stores, for example, context information.

The storage unit 64 may store, for example, information on the movement source distributed station. The storage unit 64 may store, for example, information on the movement destination distributed station.

The output unit 65 outputs various types of information. The output unit 65 is configured to include a display device such as, for example, a CRT display, a liquid crystal display, or an organic EL display. The output unit 65 may be configured as an interface that connects these display devices to the distributed station 6. The output unit 65 outputs, for example, information input to the input unit 62.

Figure 14:
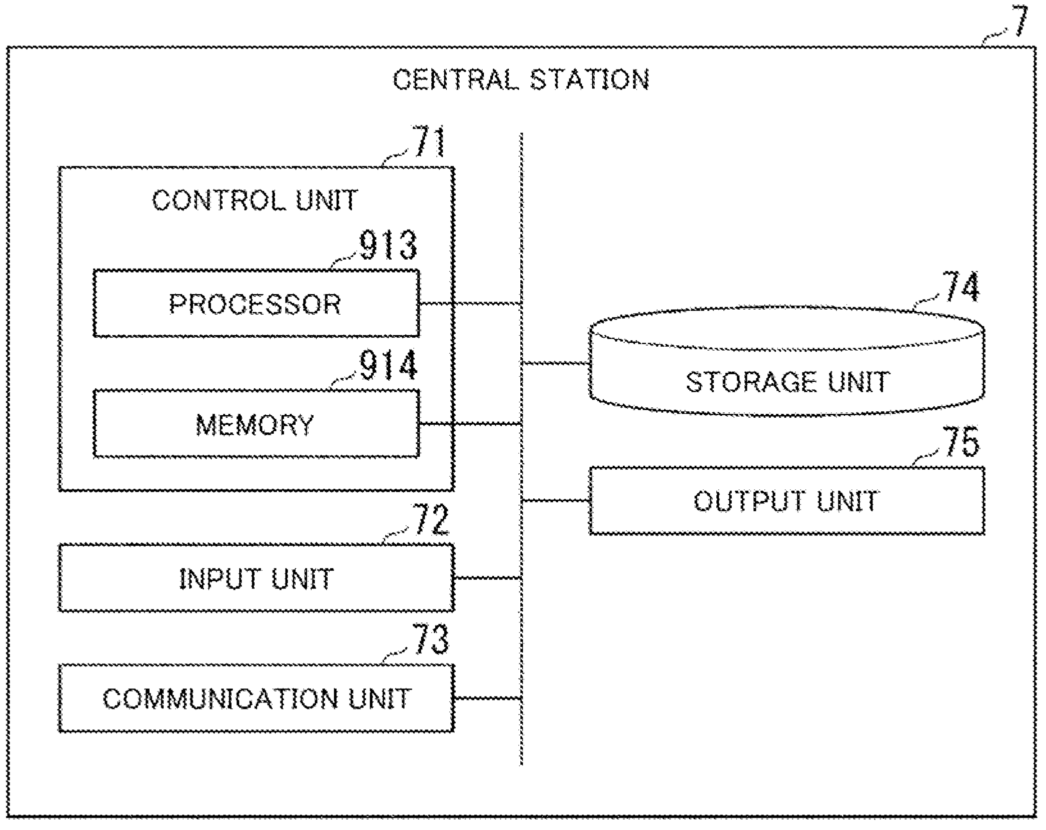
FIG. 14 is a diagram illustrating an example of a hardware configuration of a central station 7 in the third embodiment.

FIG. 14 is a diagram illustrating an example of a hardware configuration of the central station 7 in the third embodiment. The central station 7 includes a control unit 71 having a processor 913 such as a CPU and a memory 914 which are connected to each other through a bus, and executes a program. The central station 7 functions as a device including the control unit 71, an input unit 72, a communication unit 73, a storage unit 74, and an output unit 75 by executing a program.

More specifically, the processor 913 reads out a program stored in the storage unit 74 and causes the memory 914 to store the readout program. By the processor 913 executing the program stored in the memory 914, the central station 7 functions as a device including the control unit 71, the input unit 72, the communication unit 73, the storage unit 74, and the output unit 75.

The control unit 71 controls the operations of various types of functional units included in the central station 7 such as the input unit 72, the communication unit 73, the storage unit 74, and the output unit 75. The control unit 71 records, for example, various types of information in the storage unit 74.

The control unit 71 executes, for example, the switching execution determination process. The control unit 71 receives, for example, the measurement information report signal through the communication unit 73. In the switching execution determination process, determination based on the received measurement information report signal is performed.

The control unit 71 transmits, for example, the context correction request through the communication unit 73. The control unit 71 receives, for example, the signal transfer status notification through the communication unit 73. The control unit 71 transmits, for example, the context release command through the communication unit 73. The control unit 71 receives, for example, the context release response through the communication unit 73. The control unit 71 transmits, for example, the received user signal to a predetermined transmission destination through the communication unit 63.

The input unit 72 is configured to include input devices such as, mouse, a keyboard, and a touch panel. The input unit 72 may be configured as an interface that connects these input devices to the central station 7. The input unit 72 accepts input of various types of information to the central station 7.

The communication unit 73 is configured to include a communication interface for connecting the central station 7 to an external device. The communication unit 73 communicates with an external device through wired or wireless connection. The external device is, for example, the transfer device 40*b*. The external device is, for example, a device that is a transmission source of a user signal such as the server 1.

The storage unit 74 is configured using a computer readable storage medium device such as a magnetic hard disk device or a semiconductor storage device. The storage unit 74 stores various types of information relating to the central station 7. The storage unit 74 stores, for example, information input through the input unit 72 or the communication unit 73.

The output unit 75 outputs various types of information. The output unit 75 is configured to include a display device such as, for example, a CRT display, a liquid crystal display, or an organic EL display. The output unit 75 may be configured as an interface that connects these display devices to the central station 7. The output unit 75 outputs, for example, information input to the input unit 72.

Figure 15:
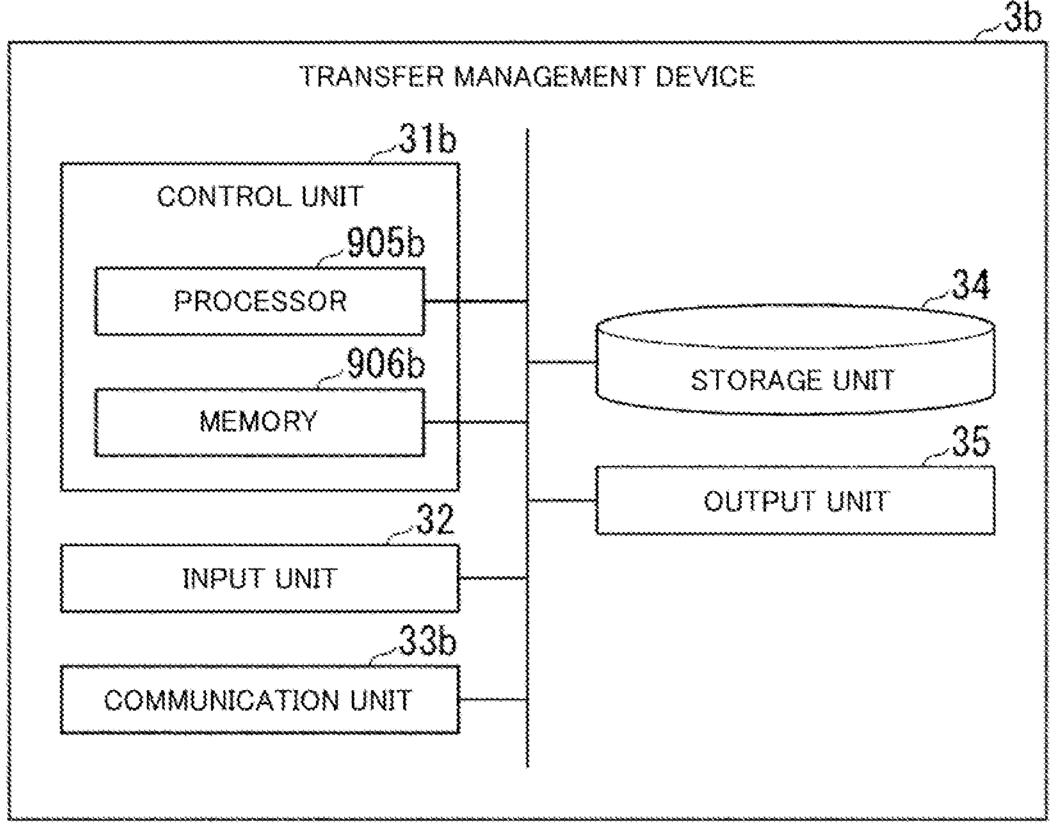
FIG. 15 is a diagram illustrating an example of a hardware configuration of a transfer management device 3*b* in the third embodiment.

FIG. 15 is a diagram illustrating an example of a hardware configuration of the transfer management device 3*b* in the third embodiment. The transfer management device 3*b* includes a control unit 31*b* having a processor 905*b* such as a CPU and a memory 906*b* which are connected to each other through a bus, and executes a program. The transfer management device 3*b* functions as a device including the control unit 31*b*, the input unit 32, the communication unit 33*b*, the storage unit 34, and the output unit 35 by executing a program.

More specifically, the processor 905*b* reads out a program stored in the storage unit 34 and causes the memory 906*b* to store the readout program. By the processor 905*b* executing the program stored in the memory 906*b*, the transfer management device 3*b* functions as a device including the control unit 31*b*, the input unit 32, the communication unit 33*b*, the storage unit 34, and the output unit 35.

The control unit 31*b* controls the operations of various types of functional units included in the transfer management device 3*b* such as the input unit 32, the communication unit 33*b*, the storage unit 34, and the output unit 35. The control unit 31*b* records, for example, various types of information in the storage unit 34.

The control unit 31*b* receives, for example, the context correction request from the central station 7 through the communication unit 33*b*. When the context correction request is received, the control unit 31*b* executes the transfer route control process for the transfer device network 4*b*. In the transfer route control process, the control unit 31*b* controls the operation of one or a plurality of transfer devices 40*b* included in the transfer device network 4*b* through the communication unit 33*b* on the basis of the context correction request. The control unit 31*b* controls the paths in the transfer device network 4*b* by controlling the operation of one or a plurality of transfer devices 40*b*.

The communication unit 33*b* is configured to include a communication interface for connecting the transfer management device 3*b* to an external device. The communication unit 33*b* communicates with an external device through wired or wireless connection. The external device is, for example, the central station 7. The external device is, for example, the transfer device 40*b*.

Figure 16:
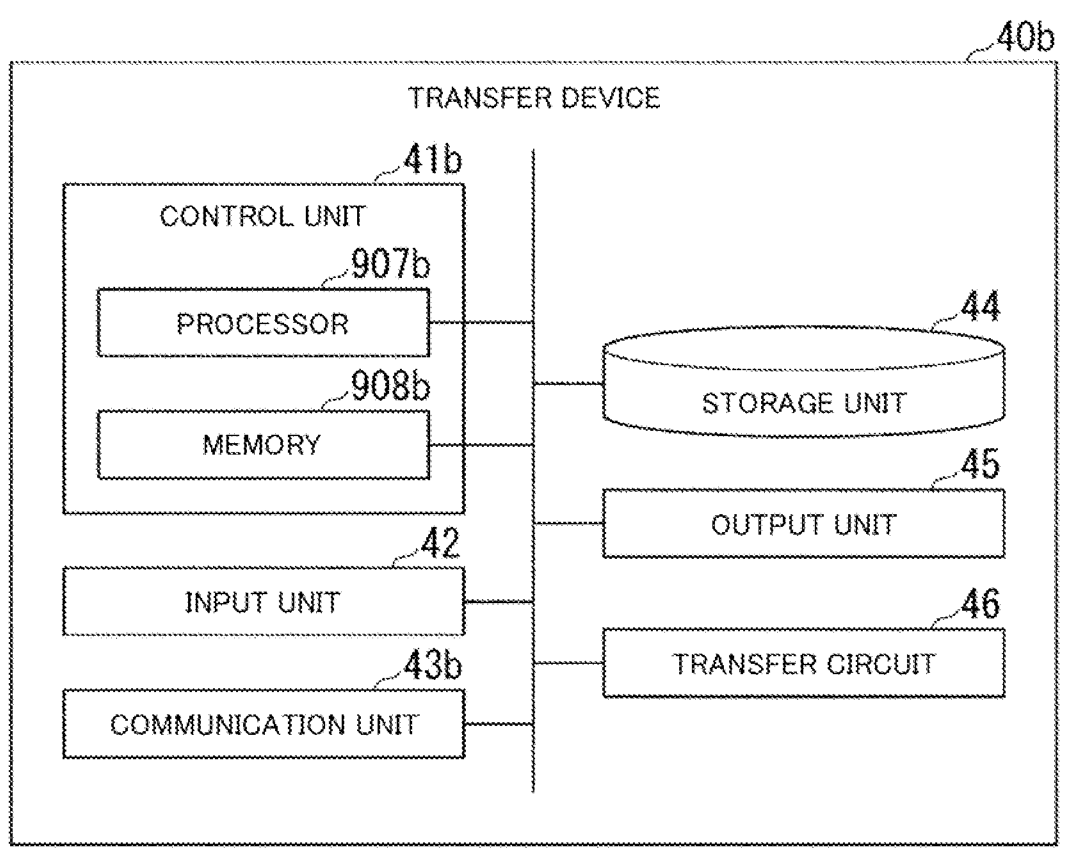
FIG. 16 is a diagram illustrating an example of a hardware configuration of a transfer device 40*b* in the embodiment.

FIG. 16 is a diagram illustrating an example of a hardware configuration of the transfer device 40*b* in the embodiment. The transfer device 40*b* includes a control unit 41*b* having a processor 907*b* such as a CPU and a memory 908*b* which are connected to each other through a bus, and executes a program. The transfer device 40*b* functions as a device including the control unit 41*b*, the input unit 42, the communication unit 43*b*, the storage unit 44, the output unit 45, and the transfer circuit 46 by executing a program.

More specifically, the processor 907*b* reads out a program stored in the storage unit 44 and causes the memory 908*b* to store the readout program. By the processor 907*b* executing the program stored in the memory 908*b*, the transfer device 40*b* functions as a device including the control unit 41*b*, the input unit 42, the communication unit 43*b*, the storage unit 44, the output unit 45, and the transfer circuit 46.

The control unit 41*b* controls the operations of various types of functional units included in the transfer device 40*b* such as the input unit 42, the communication unit 43*b*, the storage unit 44, the output unit 45, and the transfer circuit 46. The control unit 41*b* records, for example, various types of information in the storage unit 44. The control unit 41*b* changes, for example, the connection destination of the transfer circuit 46 in accordance with the control of the transfer management device 3. That is, the control unit 41*b* controls the operation of an element included in the transfer circuit 46, that is, an element that switches a circuit, so that the connection destination of the transfer circuit 46 is changed, and the path is changed or added.

The communication unit 43*b* is configured to include a communication interface for connecting the transfer device 40*b* to an external device. The communication unit 43*b* communicates with an external device through wired or wireless connection. The external device is, for example, the transfer management device 3*b*. The external device is, for example, the central station 7.

In the wireless communication system 100*b* of the third embodiment configured in this way, the context correction request is also transmitted to the transfer management device 3*b* before the completion of the switching process. Therefore, the wireless communication system 100*b* can reduce the time required to form a path.

Modification Example of Third Embodiment

Meanwhile, as described above, the control unit 61 included in the distributed station 6 executes the switching process. Thus, the control unit 61 included in the distributed station 6 is an example of an end communication control unit which is a functional unit that executes the switching process.

Meanwhile, as described above, the context correction request is information indicating the result of execution of the switching execution determination process. The result of execution of the switching execution determination process is specifically information indicating that the distributed station 6 satisfying the terminal signal strength condition has been changed from the distributed station 6 of current affiliation to the other distributed station 6 and the distributed station 6 that is a change destination. Therefore, the context correction request is information relating to the status of communication between the wireless terminal 9 and the distributed station 6 and is information indicating the distributed station 6 with which the wireless terminal 9 is affiliated. Thus, the context correction request is an example of communication status information.

Meanwhile, as described above, the control unit 31*b* included in the transfer management device 3*b* executes the transfer route control process in a case where the context correction request is received. The context correction request is an example of communication status information, and the transfer route control process of step S306 is a process of controlling the paths between the plurality of transfer devices 40*b* on the basis of the received context correction request. Therefore, the control unit 31*b* included in the transfer management device 3*b* is an example of the transfer route control unit.

Example of Application Situation

Meanwhile, in the wireless communication system 100*b*, the central station 7 may have a function of the CU in the communication standard of mobile communication, and the distributed station 6 may have a function of the DU. The central station 7 having a function of the CU specifically means that the control unit 71 included in the central station 7 executes processing specified as processing of the CU in the communication standard of mobile communication.

The distributed station 6 having a function of the DU specifically means that the control unit 61 included in the distributed station 6 executes processing specified as processing of the DU in the communication standard of mobile communication. Meanwhile, in a case where the central station 7 has a function of the CU in the communication standard of mobile communication and the distributed station 6 has a function of the DU, the transfer device 40*b* is installed in a section called a mobile midhaul (MMH) in the standard of mobile communication.

Meanwhile, in the wireless communication system 100*b*, the central station 7 may have a function of the DU in the communication standard of mobile communication, and the distributed station 6 may have a function of the RU. The central station 7 having a function of the DU specifically means that the control unit 71 included in the central station 7 executes processing specified as processing of the DU in the communication standard of mobile communication.

The distributed station 6 having a function of the RU specifically means that the control unit 61 included in the distributed station 6 executes processing specified as processing of the RU in the communication standard of mobile communication. Meanwhile, in a case where the central station 7 has a function of the DU in the communication standard of mobile communication and the distributed station 6 has a function of the RU, the transfer device 40*b* is installed in a section called a mobile fronthaul in the standard of mobile communication.

Meanwhile, in the wireless communication system 100*b*, the central station 7 may have functions of the CU and DU in the communication standard of mobile communication, and the distributed station 6 may have a function of the RU. The central station 7 having functions of the CU and DU specifically means that the control unit 71 included in the central station 7 executes processing specified as processing of the CU and DU in the communication standard of mobile communication.

Meanwhile, in the wireless communication system 100*b*, the central station 7 may be a Wi-Fi controller, and the distributed station 6 may be a Wi-Fi access point.

Fourth Embodiment

Figure 17:
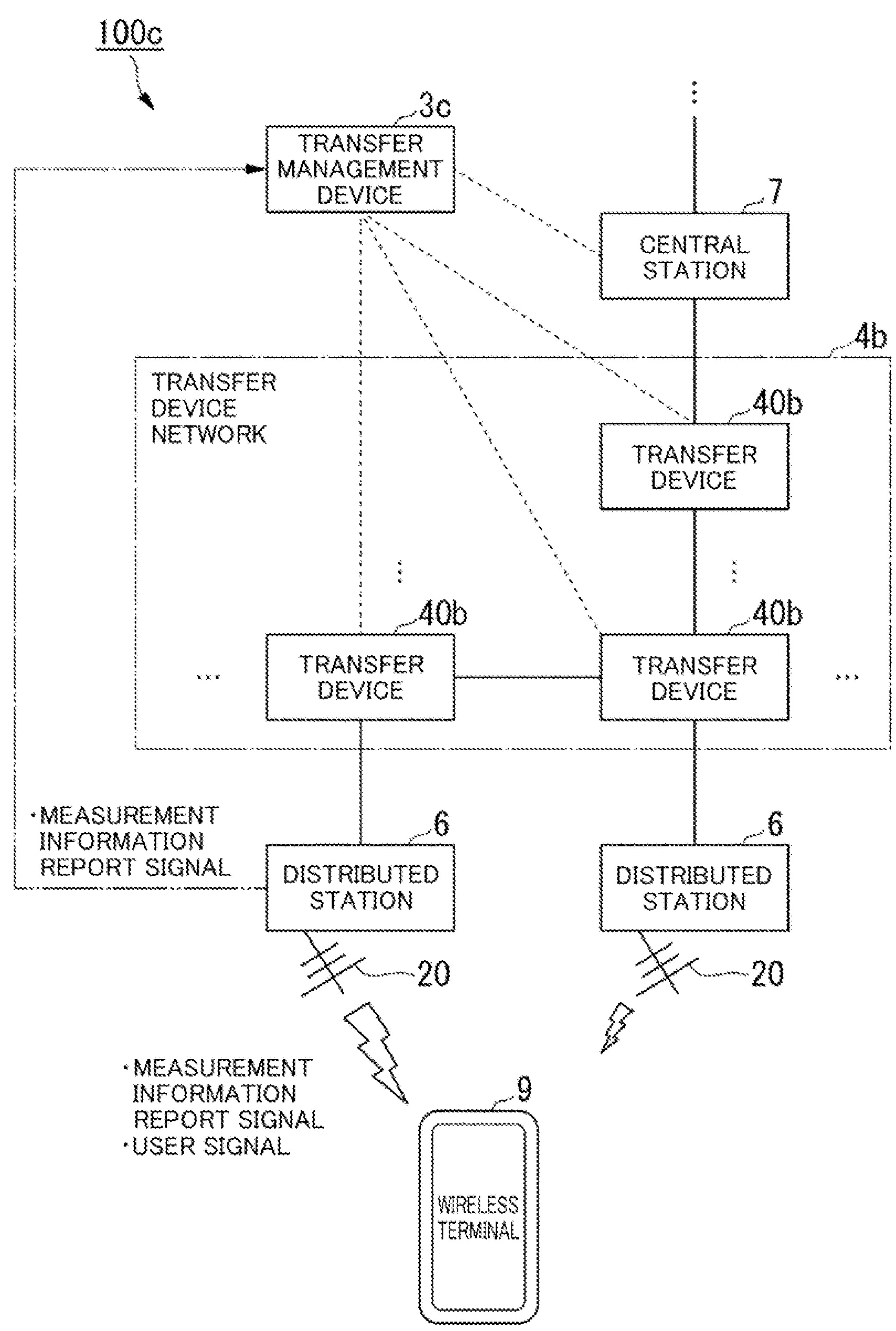
FIG. 17 is a diagram illustrating an example of a configuration of a wireless communication system 100*c* of a fourth embodiment.

FIG. 17 is a diagram illustrating an example of a configuration of a wireless communication system 100*c* of a fourth embodiment. For the sake of simplicity of the following description, components having the same functions as the functional units included in the wireless communication system 100*b* of the third embodiment are denoted by the same reference numerals and signs as in FIGS. 1 to 16, and thus description thereof will be omitted.

The wireless communication system 100*c* differs from the wireless communication system 100*b* in that a transfer management device 3*c* is provided instead of the transfer management device 3*b* and that a signal received by the transfer management device 3*c* is a measurement information report signal instead of the context correction request.

More specifically, the transfer management device 3*c* differs from the transfer management device 3*b* in that the measurement information report signal is received from the distributed station 6 instead of the context correction request being received from the central station 7. In addition, the transfer management device 3*c* executes the transfer route control process on the basis of the received measurement information report signal. The control target of the transfer route control process executed by the transfer management device 3*c* is the transfer device network 4*b*.

Specifically, the transfer management device 3*c* executes the switching execution determination process and executes the transfer route control process on the basis of the result of the executed switching execution determination process.

That is, the transfer management device 3*c* differs from the transfer management device 3*b* in that the result of the switching execution determination process is acquired by the transfer management device 3*c* executing the switching execution determination process instead of the result of the switching execution determination process being acquired from the central station 7.

Figure 18:
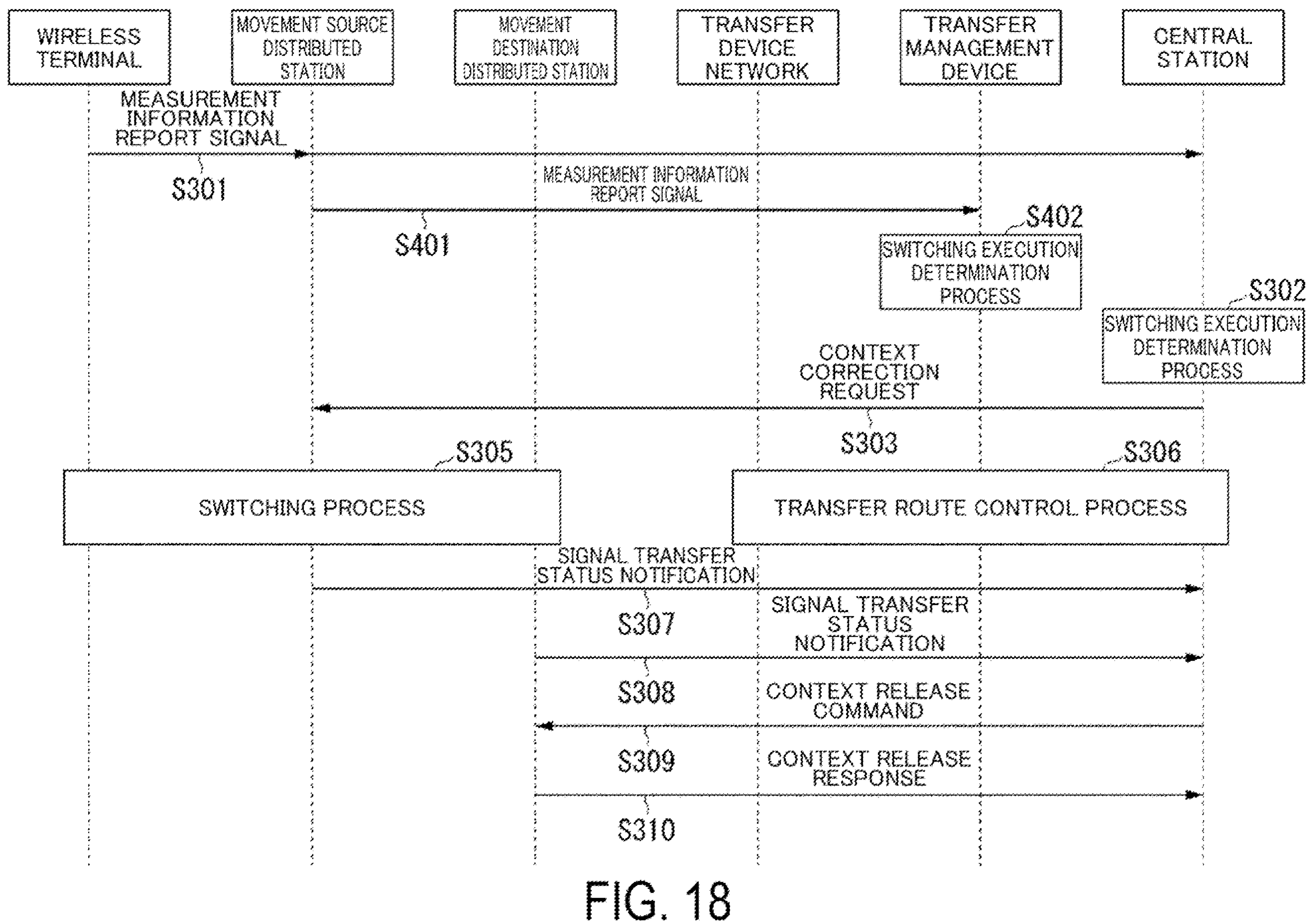
FIG. 18 is a sequence diagram illustrating an example of a flow of processing executed by the wireless communication system 100*c* of the fourth embodiment.

FIG. 18 is a sequence diagram illustrating an example of a flow of processing executed by the wireless communication system 100*c* of the fourth embodiment. More specifically, FIG. 18 is a diagram illustrating an example of a flow of processing executed by the wireless communication system 100*c*, taking as an example a case where the result of the switching execution determination process is a result that the affiliation needs to be changed. Hereinafter, the same processes as the processes described in FIG. 12 are denoted by the same reference numerals and signs as in FIG. 12, and thus description thereof will be omitted.

In the wireless communication system 100*c*, after the process of step S101, the transfer management device 3*c* executes a process of receiving the measurement information report signal from the movement source distributed station (step S401). Next, the transfer management device 3*c* executes the switching execution determination process (step S402). Next, the transfer management device 3*c* executes the transfer route control process (step S306).

Meanwhile, the process of step S401 may be executed before the process of step S101.

As shown in FIG. 18, in the wireless communication system 100*c*, a second subflow is executed until a first subflow is completed. The first subflow is a flow of processing in which the process of step S401 is executed, the process of step S402 is then executed, and the process of the step S306 is executed next. The second subflow is a flow of processing in which the process of step S302 is executed, the process of step S303 is then executed, and the process of step S305 is started next. Therefore, in the wireless communication system 100*c*, the execution of the switching process and the execution of the transfer route control process can be executed simultaneously.

Figure 19:
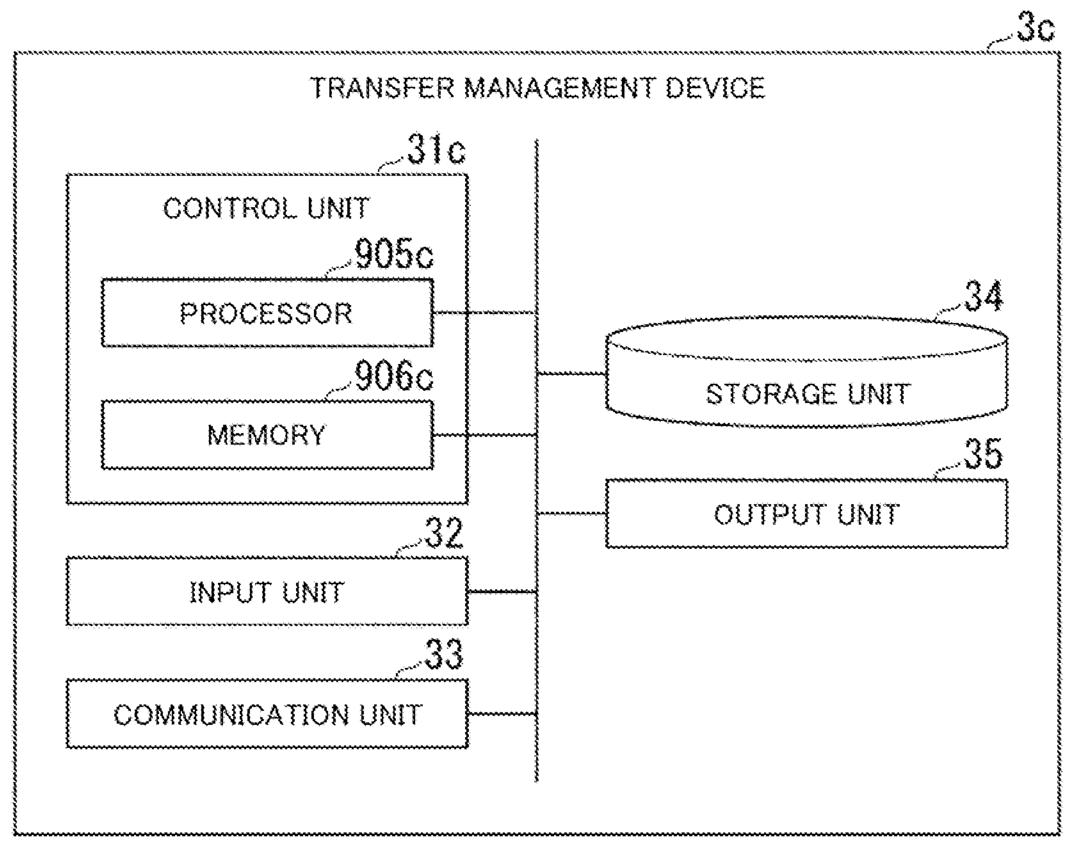
FIG. 19 is a diagram illustrating of an example of a hardware configuration of a transfer management device 3*c* in the fourth embodiment.

FIG. 19 is a diagram illustrating an example of a hardware configuration of the transfer management device 3*c* in the fourth embodiment. The transfer management device 3*c* includes a control unit 31*c* having a processor 905*c* such as a CPU and a memory 906*c* which are connected to each other through a bus, and executes a program. The transfer management device 3*c* functions as a device including the control unit 31*c*, the input unit 32, the communication unit 33*c*, the storage unit 34, and the output unit 35 by executing a program.

More specifically, the processor 905*c* reads out a program stored in the storage unit 34 and causes the memory 906*c* to store the readout program. By the processor 905*c* executing the program stored in the memory 906*c*, the transfer management device 3*c* functions as a device including the control unit 31*c*, the input unit 32, the communication unit 33*c*, the storage unit 34, and the output unit 35.

The control unit 31*c* controls the operations of various types of functional units included in the transfer management device 3*c* such as the input unit 32, the communication unit 33*c*, the storage unit 34, and the output unit 35. The control unit 31*c* records, for example, various types of information in the storage unit 34.

The control unit 31*c* receives the measurement information report signal from the movement source distributed station through the communication unit 33*c*. The control unit 31*c* executes, for example, the switching execution determination process. The control unit 31*c* executes, for example, the transfer route control process. In the transfer route control process, the control unit 31*c* controls the paths in the transfer device network 4*b* by controlling the operation of one or a plurality of transfer devices 40*b* included in the transfer device network 4*b* through the communication unit 33*c*.

The communication unit 33*c* is configured to include a communication interface for connecting the transfer management device 3*c* to an external device. The communication unit 33*c* communicates with an external device through wired or wireless connection. The external device is, for example, the central station 7. The external device is, for example, the transfer device 40*b*. The external device is, for example, the distributed station 6.

In this way, in the wireless communication system 100*c* of the fourth embodiment, the second subflow is executed until the first subflow is completed. Therefore, in the wireless communication system 100*c*, the execution of the switching process and the execution of the transfer route control process can be executed simultaneously. Thus, the wireless communication system 100*c* can reduce the time required to form a path even more than the wireless communication system 100*b*.

Modification Example of Fourth Embodiment

Meanwhile, as described above, the transfer management device 3*c* receives the measurement information report signal transmitted by the movement source distributed station. The transfer management device 3*c* then executes the switching execution determination process on the basis of the terminal signal strength information which is information indicated by the received measurement information report signal, and executes the transfer route control process using the execution result. That is, the transfer management device 3*c* executes the transfer route control process on the basis of the received terminal signal strength information. Thus, the transfer management device 3*c* is an example of the transfer route control unit.

Modification Example Common to First to Fourth Embodiments

The wireless communication system 100 to the wireless communication system 100*c* may all include a base station management device that controls a plurality of end wireless devices. Control performed by the base station management device specifically involves executing a process of optimizing radio propagation between the end wireless device that is a control target and the wireless terminal 9. The optimization of radio propagation is optimization of radio strength and radio schemes such as modulation schemes.

The base station management device further receives communication status information from the end wireless device, and transfers the received communication status information to the transfer management devices 3 to 3*c*. Hereinafter, an example in which each of the wireless communication systems 100 to 100*c* includes the base station management device will be described.

Hereinafter, the wireless communication system 100 including the base station management device is referred to as a wireless communication system 100*d*. Hereinafter, the wireless communication system 100*a* including the base station management device is referred to as a wireless communication system 100*e*. Hereinafter, the wireless communication system 100*b* including the base station management device is referred to as a wireless communication system 100*f*. Hereinafter, the wireless communication system 100*c* including the base station management device is referred to as a wireless communication system 100*g*.

For the sake of simplicity of the following description, components having the same functions as the functional units included in the wireless communication systems 100 to 100*c* are denoted by the same reference numerals and signs as in FIGS. 1 to 19, and thus description thereof will be omitted. In addition, for the sake of simplicity of the following description, the same processes as the processes executed by the wireless communication systems 100 to 100*c* are denoted by the same reference numerals and signs as in FIGS. 1 to 19, and thus description thereof will be omitted.

Figure 20:
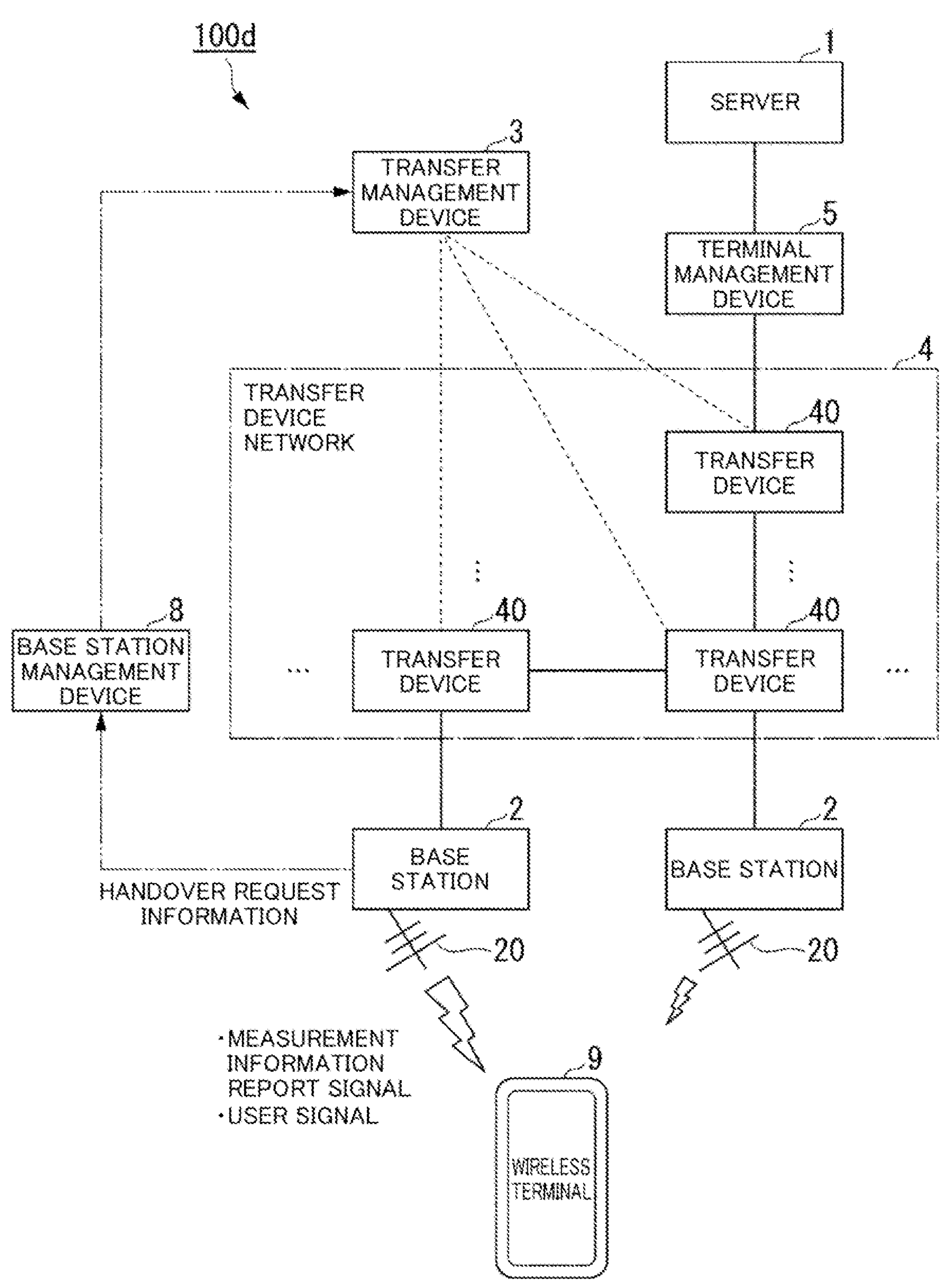
FIG. 20 is a diagram illustrating an example of a configuration of a wireless communication system 100*d* in a modification example.

FIG. 20 is a diagram illustrating an example of a configuration of the wireless communication system 100*d* in the modification example. The wireless communication system 100*d* includes a base station management device 8. The base station management device 8 is a base station management device. The base station management device 8 acquires handover request information from the base station 2 and transfers the acquired handover request information to the transfer management device 3. That is, the process of step S104 in which the handover request information is transmitted from the movement source base station of FIG. 2 to the transfer management device 3 is realized through the base station management device 8.

Figure 21:
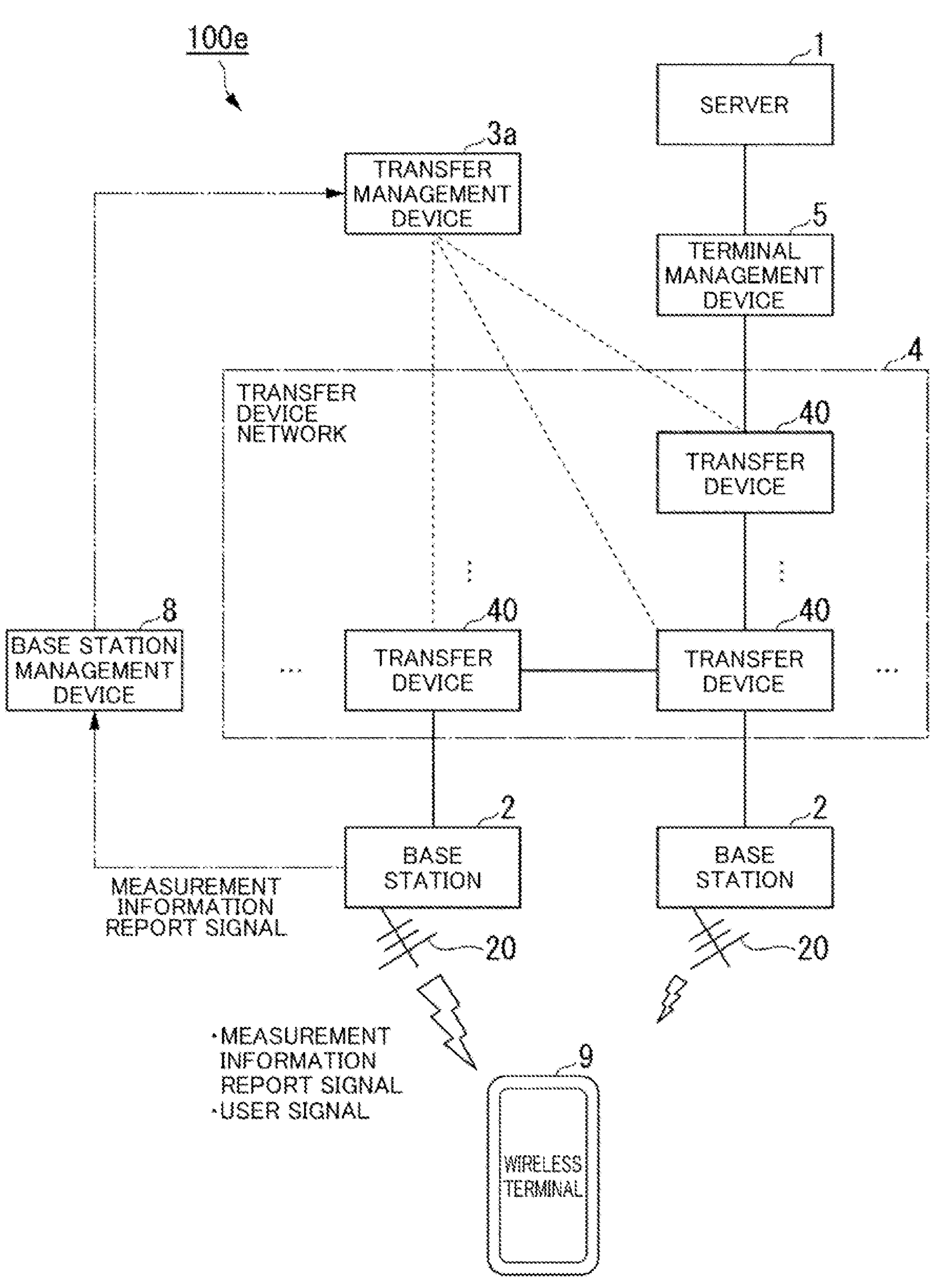
FIG. 21 is a diagram illustrating an example of a configuration of a wireless communication system 100*e* in the modification example.

FIG. 21 is a diagram illustrating an example of a configuration of the wireless communication system 100*e* in the modification example. The wireless communication system 100*e* includes the base station management device 8. The base station management device 8 acquires the measurement information report signal from the base station 2 and transfers the acquired measurement information report signal to the transfer management device 3. That is, the process of step S201 in which the measurement information report signal is transmitted from the wireless terminal 9 of FIG. 9 to the transfer management device 3 is realized through the movement source base station and the base station management device 8.

Figure 22:
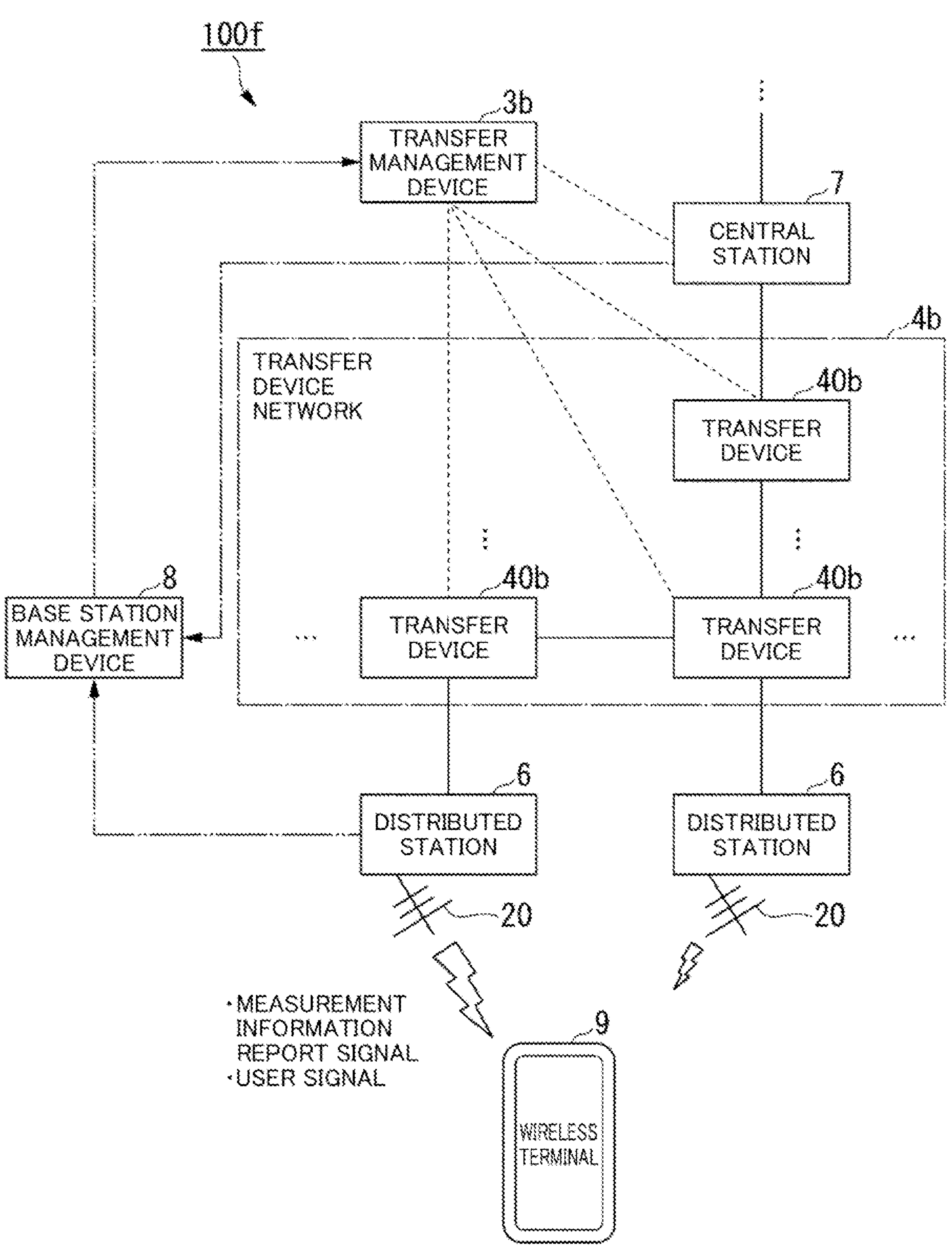
FIG. 22 is a diagram illustrating an example of a configuration of a wireless communication system 100*f* in the modification example.

FIG. 22 is a diagram illustrating an example of a configuration of the wireless communication system 100*f* in the modification example. The wireless communication system 100*f* includes the base station management device 8. The base station management device 8 acquires a context correction request from the central station 7 and transfers the acquired context correction request to the transfer management device 3*b*. That is, the process of step S304 in which the context correction request is transmitted from the central station 7 of FIG. 12 to the transfer management device 3 is realized through the base station management device 8.

Figure 23:
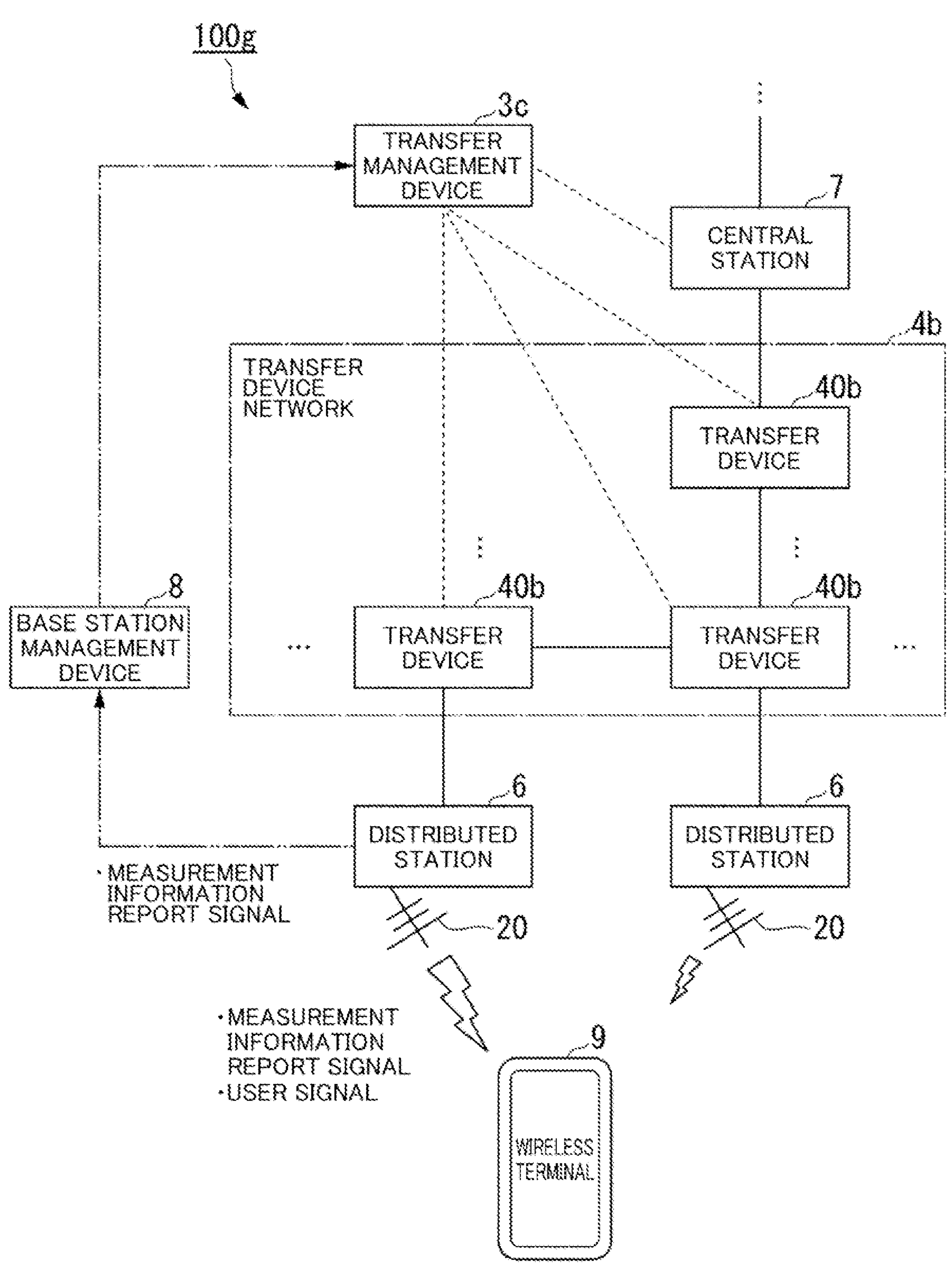
FIG. 23 is a diagram illustrating an example of a configuration of a wireless communication system 100*g* in the modification example.

FIG. 23 is a diagram illustrating an example of a configuration of the wireless communication system 100*g* in the modification example. The wireless communication system 100*g* includes the base station management device 8. The base station management device 8 acquires the measurement information report signal from the base station 2 and transfers the acquired measurement information report signal to the transfer management device 3. That is, the process of step S401 in which the measurement information report signal is transmitted from the wireless terminal 9 of FIG. 18 to the transfer management device 3 is realized through the movement source distributed station and the base station management device 8.

Figure 24:
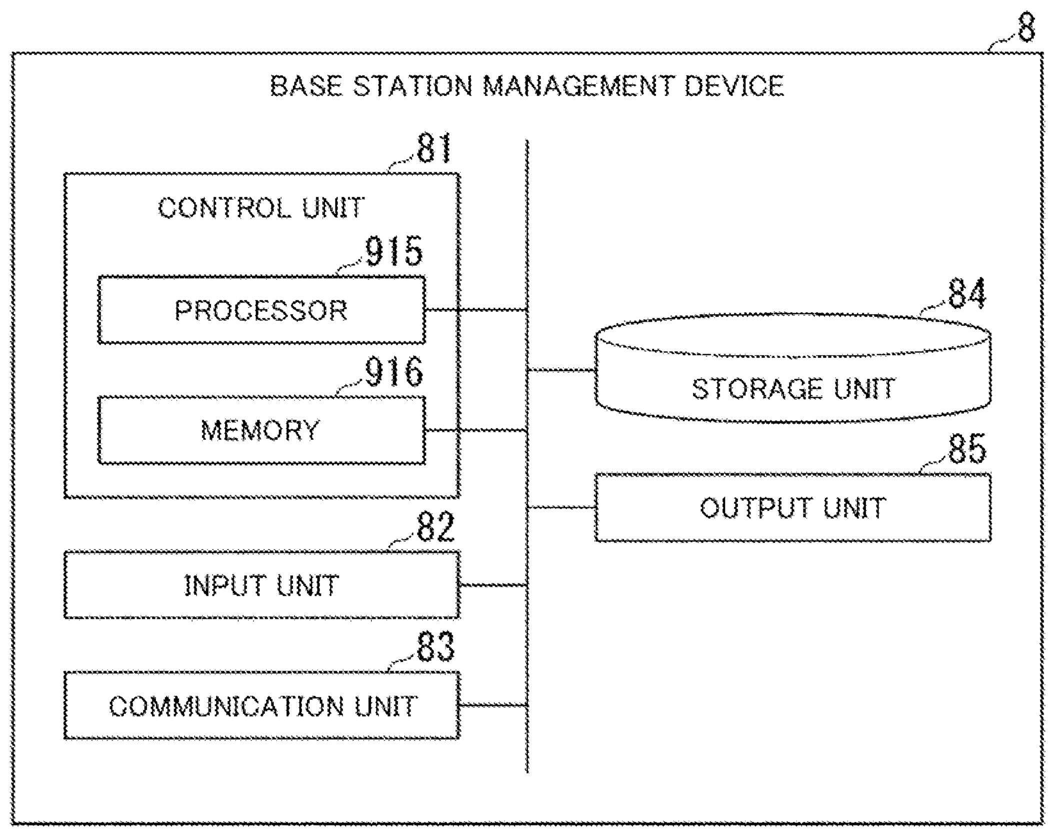
FIG. 24 is a diagram illustrating an example of a hardware configuration of a base station management device 8 in the modification example.

FIG. 24 is a diagram illustrating an example of a hardware configuration of the base station management device 8 in the modification example. The base station management device 8 includes a control unit 81 having a processor 915 such as a CPU and a memory 916 which are connected to each other through a bus, and executes a program. The base station management device 8 functions as a device including the control unit 81, an input unit 82, a communication unit 83, a storage unit 84, and an output unit 85 by executing a program.

More specifically, the processor 915 reads out a program stored in the storage unit 84 and causes the memory 916 to store the readout program. By the processor 915 executing the program stored in the memory 916, the base station management device 8 functions as a device including the control unit 81, the input unit 82, the communication unit 83, the storage unit 84, and the output unit 85.

The control unit 81 controls the operations of various types of functional units included in the base station management device 8 such as the input unit 82, the communication unit 83, the storage unit 84, and the output unit 85. The control unit 81 records, for example, various types of information in the storage unit 84.

The control unit 81 controls, for example, a plurality of end wireless devices which are control targets through the communication unit 83. The plurality of end wireless devices which are control targets are a plurality of base stations 2 in the wireless communication system 100*d* and the wireless communication system 100*e*. The plurality of end wireless devices which are control targets are a plurality of distributed stations 6 in the wireless communication system 100*f* and the wireless communication system 100*g*.

The control unit 81 acquires, for example, the communication status information from the end wireless device which is a control target through the communication unit 83. The control unit 81 transfers the acquired communication status information to the transfer destination through the communication unit 83. The transfer destination is the transfer management device 3 in the wireless communication system 100*d*. The transfer destination is the transfer management device 3*a* in the wireless communication system 100*e*. The transfer destination is the transfer management device 3*b* in the wireless communication system 100*f*. The transfer destination is the transfer management device 3*c* in the wireless communication system 100*g*.

The input unit 82 is configured to include input devices such as, mouse, a keyboard, and a touch panel. The input unit 82 may be configured as an interface that connects these input devices to the base station management device 8. The input unit 82 accepts input of various types of information to the base station management device 8.

The communication unit 83 is configured to include an communication interface for connecting the base station management device 8 to an external device. The communication unit 83 communicates with an external device through wired or wireless connection. The external device is, for example, an end wireless device. The external device is, for example, a transfer destination of the communication status information.

The storage unit 84 is configured using a computer readable storage medium device such as a magnetic hard disk device or a semiconductor storage device. The storage unit 84 stores various types of information relating to the base station management device 8. The storage unit 84 stores, for example, information input through the input unit 82 or the communication unit 83.

The output unit 85 outputs various types of information. The output unit 85 is configured to include a display device such as, for example, a CRT display, a liquid crystal display, or an organic EL display. The output unit 85 may be configured as an interface that connects these display devices to the base station management device 8. The output unit 85 outputs, for example, information input to the input unit 82.

Meanwhile, all or some of the functions of the wireless communication systems 100 to 100*g*, the server 1, the base station 2, the transfer management devices 3 to 3*c*, the transfer devices 40 and 40*b*, the terminal management device 5, the distributed station 6, the central station 7, and the base station management device 8 may be realized using hardware such as an application specific integrated circuit (ASIC), a programmable logic device (PLD), or a field programmable gate array (FPGA). The program may be recorded on a computer-readable recording medium. The computer-readable recording medium is, for example, a flexible disk, a magneto-optical disk, a ROM, a portable medium such as a CD-ROM, or a storage device such as a hard disk built into a computer system. The program may be transmitted through an electric communication line.

Although the embodiments of the present invention have been described in detail with reference to the drawings, specific configurations are not limited to these embodiments, and designs and the like within a range that does not deviating from the gist of the present invention are also included.

REFERENCE SIGNS LIST

100 to 100*g* Wireless communication system, 1 Server, 2 Base station, 3 to 3*c* Transfer management device, 4, 4*b* Transfer device network, 5 Terminal management device, 6 Distributed station, 7 Central station, 8 Base station management device, 40, 40*b* Transfer device, 11 Control unit, 12 Input unit, 13 Communication unit, 14 Storage unit, 15 Output unit, 20 Transmitting/receiving antenna, 21 Control unit, 22 Input unit, 23 Communication unit, 24 Storage unit, 25 Output unit, 30 Receiving antenna, 31, 31*a*, 31*b*, 31*c* Control unit, 32 Input unit, 33, 33*b* Communication unit, 34 Storage unit, 35 Output unit, 41, 41*b* Control unit, 42 Input unit, 43, 43*b* Communication unit, 44 Storage unit, 45 Output unit, 46 Transfer circuit, 51 Control unit, 52 Input unit, 53 Communication unit, 54 Storage unit, 55 Output unit, 61 Control unit, 62 Input unit, 63 Communication unit, 64 Storage unit, 65 Output unit, 71 Control unit, 72 Input unit, 73 Communication unit, 74 Storage unit, 75 Output unit, 81 Control unit, 82 Input unit, 83 Communication unit,

84 Storage unit, 85 Output unit, 9 Wireless terminal, 901, 903, 905, 905*a*, 905*b*, 905*c*, 907, 907*b*, 909, 911, 913.915 Processor, 902, 904, 906, 906*a*, 906*b*, 906*c*, 908, 908*b*, 910, 912, 914.916 Memory

The invention claimed is:

1. A wireless communication system comprising:

a plurality of end wireless devices, each including an antenna, a first processor and a first storage medium having first computer program instructions stored thereon, that transmit and receive signals to and from a wireless terminal which is a communication target;

a plurality of transfer devices that transfer signals which are transmitted and received by the wireless terminal which is a communication target and the end wireless device; and a transfer management device that includes a second processor and a second storage medium having second computer program instructions stored thereon, wherein the second computer program instruction, when executed by the second processor, perform processing of:

executing a transfer route control process of controlling paths between the plurality of transfer devices on the basis of the received communication status information, in a case where communication status information indicating a status of communication between the wireless terminal and the end wireless devices is received, wherein the first computer program instruction, when executed by the first processor, perform processing of:

executing a switching process of controlling operations of the end wireless devices relating to communication between the end wireless devices and the wireless terminal on the basis of the communication status information, and the second processor receives the communication status information before the switching process is completed, and executes the transfer route control process on the basis of the received communication status information while the switching process is executed by the first processor.

2. The wireless communication system according to claim 1, wherein the communication status information received by the end wireless devices indicates a terminal signal strength which is a strength of a signal received by the wireless terminal and transmitted from the antenna.

3. The wireless communication system according to claim 2, wherein the communication status information received by the transfer management device indicates a terminal signal strength which is a strength of a signal received by the wireless terminal and transmitted from the antenna.

4. The wireless communication system according to claim 3, wherein the second computer program instruction, when executed by the second processor, perform processing of:

determining whether the switching process is executed on the basis of the terminal signal strength.

5. The wireless communication system according to claim 2, wherein the communication status information received by the transfer management device is information obtained on the basis of the terminal signal strength.

6. The wireless communication system according to claim 5, wherein the first computer program instruction, when executed by the first processor, perform processing of: determining whether the switching process is executed on the basis of the terminal signal strength, and the information obtained on the basis of the terminal signal strength is a result of the end wireless device determining whether the switching process is executed on the basis of the terminal signal strength.

7. The wireless communication system according to claim 1, wherein the second computer program instruction, when executed by the second processor, perform processing of:

acquiring the communication status information obtained by the end wireless devices by being transferred by a base station management device that manages the end wireless devices.

8. The wireless communication system according to claim 1, wherein the switching process indicates a process of controlling operations of a switching source end wireless device that is a source for switching and a switching destination end wireless device that is a destination for switching, relating to the communication between the end wireless devices and the wireless terminal, on the basis of the communication status information, and the second processor executes the transfer route control process which controls the path between the plurality of transfer devices in accordance with the destination end wireless device, while the switching process, in which the switching destination end wireless device starts an operation relating to the communication between the switching destination end wireless devices and the wireless terminal, is executed by the first processor.

9. The wireless communication system according to claim 1, wherein the first processor executes a first determining process whether the switching process is executed on the basis of the terminal signal strength, which is a strength of a signal received by the wireless terminal and transmitted from the antenna, and executes the switching process of controlling operations of the end wireless devices relating to the communication between the end wireless devices and the wireless terminal, depending on a result of the first determining process executed by the first processor, and the second processor receives the communication status information, which indicates the terminal signal strength that is the strength of the signal received by the wireless terminal and transmitted from the antenna, before the switching process is completed, executes a second determining process whether the switching process is executed on the basis of the received terminal signal strength, and executes the transfer route control process depending on a result of the second determining process executed by the second processor while the switching process is executed by the first processor.

10. The wireless communication system according to claim 1, wherein the first processor executes a first determining process whether the switching process is executed on the basis of the terminal signal strength, which is a strength of a signal received by the wireless terminal and transmitted from the antenna, and executes the switching process of controlling operations of the end wireless devices relating to the communication between the end wireless devices and the wireless terminal, depending on a result of the first determining process executed by the first processor, and the second processor receives the communication status information, which indicates the terminal signal strength that is the strength of the signal received by the wireless terminal and transmitted from the antenna, before the first determining process is completed, executes a second determining process whether the switching process is executed on the basis of the received terminal signal strength, and executes the transfer route control process depending on a result of the second determining process executed by the second processor while the switching process is executed by the first processor.

11. A wireless communication method which is executed by a wireless communication system including a plurality of end wireless devices, each including an antenna, a first processor and a first storage medium having first computer program instructions stored thereon, that transmit and receive signals to and from a wireless terminal which is a communication target; a plurality of transfer devices that transfer signals which are transmitted and received by the wireless terminal which is a communication target and the end wireless device; and a transfer management device that includes a second processor and a second storage medium having second computer program instructions stored thereon, wherein the second computer program instruction, when executed by the second processor, perform processing of: executing a transfer route control process of controlling paths between the plurality of transfer devices on the basis of the received communication status information, in a case where communication status information indicating a status of communication between the wireless terminal and the end wireless devices is received, the method comprising:

the first processor executing a switching process of controlling operations of the end wireless devices relating to communication between the end wireless devices and the wireless terminal on the basis of the communication status information; and the second processor receiving the communication status information before the switching process is completed, and executing the transfer route control process on the basis of the received communication status information while the switching process is executed by the first processor.

* * * * *